United States Patent [19]
Watarai et al.

[11] Patent Number: 5,719,460
[45] Date of Patent: Feb. 17, 1998

[54] ANGULAR VELOCITY SENSOR

[75] Inventors: Takehiro Watarai, Nagoya; Satoshi Hayashi, Kuwana; Kenzi Kato, Okazaki; Kazuhiko Miura, Yokkaichi; Tomoo Kawase, Nagoya; Yoshinobu Takeuchi, Kuwana, all of Japan

[73] Assignee: Nippondenso Co., Ltd, Japan

[21] Appl. No.: 563,378

[22] Filed: Nov. 28, 1995

[30] Foreign Application Priority Data

| Nov. 28, 1994 | [JP] | Japan | 6-293117 |
| Jun. 22, 1995 | [JP] | Japan | 7-156095 |
| Jul. 4, 1995 | [JP] | Japan | 7-168723 |
| Oct. 11, 1995 | [JP] | Japan | 7-263194 |

[51] Int. Cl.$^6$ ............................................ H01L 41/08
[52] U.S. Cl. .................. 310/316; 310/319; 310/324; 310/366; 310/370; 310/348; 310/353; 73/505
[58] Field of Search ........................... 310/316, 317, 310/319, 370, 321, 366, 329; 73/505

[56] References Cited

U.S. PATENT DOCUMENTS

| 3,697,766 | 10/1972 | Ganter et al. | 310/370 |
| 5,220,833 | 6/1993 | Nakamura | 310/316 X |
| 5,336,960 | 8/1994 | Shimizu et al. | 310/369 |
| 5,375,336 | 12/1994 | Nakamura | 310/316 X |
| 5,388,458 | 2/1995 | Weinberg et al. | 73/505 |
| 5,408,876 | 4/1995 | Macy | 73/505 |
| 5,412,204 | 5/1995 | Nakamura | 310/316 X |
| 5,420,548 | 5/1995 | Nakamura | 310/370 X |
| 5,426,970 | 6/1995 | Florida et al. | 310/316 X |
| 5,451,828 | 9/1995 | Tomikawa et al. | 310/370 |
| 5,505,085 | 4/1996 | Kasanami et al. | 310/316 X |

FOREIGN PATENT DOCUMENTS

| 61-294311 | 12/1986 | Japan . |
| 2-223817 | 9/1990 | Japan . |
| 5-306935 | 11/1993 | Japan . |
| 5-322580 | 12/1993 | Japan . |
| 2 223 309 | 8/1993 | United Kingdom . |

Primary Examiner—Mark O. Budd
Attorney, Agent, or Firm—Cushman Darby & Cushman Intellectual Property Group of Pillsbury Madison & Sutro, LLP

[57] ABSTRACT

An angular velocity detector includes vibrator made of piezoelectric material and having a pair of arms. A pair of driving electrodes are attached to the arms in order to generate vibrations in the arms. A pair of detecting electrodes, which are attached to the arms, detect the vibrations of the arms. Therefore, the pair of driving electrodes can cause the arms to vibrate uniformly and stably, so that a S/N ratio of the angular velocity sensor can be improved.

36 Claims, 17 Drawing Sheets

PORTION A

PORTION B

ANGULAR VELOCITY SENSOR

CROSS REFERENCE TO RELATED APPLICATIONS

This application is based upon and claims priority from Japanese Patent Applications No. Hei 6-293117 filed Nov. 28, 1994, No. Hei 7-156095 filed Jun. 22, 1995, No. Hei 7-168723 filed Jul. 4, 1995 and No. Hei 7-263194 filed Oct. 11, 1995, the contents of which are incorporated herein by reference.

BACKGROUND OF THE INVENTION

1. Field of the Invention

The present invention relates to an angular velocity sensor which can be used, e.g., for a vehicle motion control system, a navigation system and a video-camera to compensate for the hand movement of an operator, and more particularly an angular velocity sensor which detects angular velocity using a vibrator made from piezoelectric material.

2. Related Art

Japanese Patent Publication No. Sho 61-294311 discloses an angular velocity sensor having a vibrator made from piezoelectric material. In the angular velocity sensor, the vibrator has a shape of a tuning fork and is vibrated at a constant amplitude. When an angular velocity is applied to the vibrator, the Coriolis force generated in the vibrator is detected from variations in vibration of the vibrator. In such an angular velocity sensor, electrodes for causing the vibrator to vibrate and for detecting the Coriolis force can be attached to the side of each arm of the vibrator. Such a sensor has the advantage of having fewer parts, having a more simple structure and thus being easier to manufacture than the commonly used angular velocity sensor which is formed by sticking the piezoelectric material at the surface of a metal vibrator.

However, in the conventional angular velocity sensor disclosed in the above reference, a driving electrode is formed on one of the arms and a detecting electrode is formed on the other arm. Vibrations generated by the driving electrode are transferred from the one arm to the other arm and the vibrations of the other arm are detected by the detecting electrode. Since the hardness of the arm having the driving electrode is gradually varied during vibrations, a hardness difference is created between the pair of arms. The vibrations of the arms becomes imbalanced due to the difference in hardness, and therefore the vibration characteristic of the vibrator deteriorates. As a result, noise signals are included in the detection signal and thus the signal-to-noise ratio (S/N) of the angular velocity sensor diminishes.

Also, in the conventional angular velocity sensor, because the sensor is vibrated as a whole by driving one arm, symmetry of the vibration between the pair of the arms is broken. Therefore, the vibration is transmitted out of the vibrator via a support member which supports the vibrator at the center thereof. Due to this, S/N ratio of the angular velocity sensor diminishes as well.

Furthermore, because the vibrator is formed from piezoelectric material, the thickness of the piezoelectric material between the detecting electrodes is much greater and thus the capacitance thereof becomes less than a hundredth of that of the angular velocity sensor which is formed by sticking a piezoelectric element to a metal vibrator. As a result, when an input circuit which receives the detection signal from the detecting electrode converts an electric current flowing through the detecting electrode to a voltage signal by making use of a resistance as is commonly employed, noise components are apt to be included in the detection signal. Therefore, compared to the angular velocity sensor which is formed by sticking a piezoelectric element to a metal vibrator, the S/N ratio of the angular velocity sensor deteriorates.

SUMMARY OF THE INVENTION

The present invention is made in light of the foregoing problems, and it is an object of the present invention to improve the S/N ratio and detect an angular velocity precisely in an angular velocity sensor in which the angular velocity is detected by a vibrator formed by piezoelectric material.

For attaining the above object, the angular velocity sensor according to the present invention comprises a vibrator made from piezoelectric material and having a shape of a tuning fork, the turning fork being formed by a pair of arms and a connecting portion for connecting each end thereof. A pair of driving electrodes are attached to one of the U-shaped side faces of the arms of the vibrator, respectively. At least one detecting electrode is attached on the pair of arms between the driving electrodes and tip portions of the pair of arms, for generating a signal in accordance with vibrations of at least one of the pair of arms in a direction perpendicular to a plane in which the arms lie. A common electrode is attached to the pair of arms on the other of the U-shaped side faces so that the driving electrodes and common electrode sandwich the pair of arms. A driving device causes the vibrator to vibrate in the plane containing the pair of arms by applying an alternating voltage between the pair of driving electrodes and the common electrode. A detection device detects angular velocity around a predetermined axis based on a signal generated by the detecting electrode.

According to the angular velocity sensor described above, because the driving electrodes cause both arms to vibrate, the hardnesses of the arms remain the same, and the driving electrodes cause the arms to vibrate uniformly, thus preventing the vibration of the vibrator from being transmitted to the outside via the connecting portion. For these reasons, the vibrator can be efficiently vibrated by applying a rather low driving voltage to the driving electrodes, and the detection signal has reduced noise components, thereby improving the S/N ratio of the angular velocity sensor.

One of the driving electrodes can continuously extend from one arm to another through the connecting portion and the other of the driving electrode can continuously extend in parallel with the first driving electrode. Therefore, since the driving voltages which are applied to the driving electrodes are uniform, the vibrations in each arm are balanced, and each arm can vibrate symmetrically with the same vibration characteristic. It is possible to prevent the deterioration of the S/N ratio of the angular velocity sensor due to such uniformity of driving voltages.

In the angular velocity sensor according to the present invention, a signal processing circuit may be provided. The signal processing circuit is composed of a differential amplifier or adjustment differential amplifier which performs differential-amplification or adjustment differential-amplification for a detection signal obtained by transforming an electric current flowing through the detecting electrode into a voltage signal. Therefore, according to the present invention, the signal processing circuit can be simply composed using an operational amplifier or the like.

A monitor electrode can be provided on a U-shaped side face of the arms between the driving electrodes and the detecting electrode. A monitor signal from the monitor electrode, which shows the vibrating conditions of the arms, is used for detecting angular velocity and for generating the driving signal. That is, vibrating conditions of the arms are detected based on the monitor signal. When the monitor signal is applied to the detection device, the detection device compares the phase of the monitor signal, as a reference signal, with that of the detection signal. The detection device can detect the vibrating conditions of the arms generated by a Coriolis force and an angular velocity based on the vibrating conditions of the arms. Also, when the monitor signal is applied to the driving device and is used as another reference signal for a self-excited oscillation, the driving device can generate the driving signal for causing the each arm to vibrate at a predetermined frequency. Especially, in a preferred embodiment, by positioning the monitor electrode between the driving electrode which is attached toward the connecting portion of the arms and the detecting electrode which is attached toward the tip portion of the arms, the monitor electrode can prevent the driving signal supplied to the driving electrode from affecting the detecting electrode.

Where the detection device compares the phases of the detection signal and the monitor signal, before these signals are applied to the detection device, it is preferable that these signals are changed from electric current signals into voltage signals using a current-voltage converter including an operational amplifier. If a typical current-voltage converter is used which is includes a resistance, it not only causes the S/N ratio of the detection signal to deteriorate but also causes a phase difference between an actual motion of vibration and the monitor and detection signals because a parallel circuit of the resistance and capacitance composed of the piezoelectric material is created. In order to detect the angular velocity by synchronously demodulating the detection signal using the monitor signal as a reference signal, the phases of each signal have to correspond to the phase of the actual vibration of the arms. For that reason, a complex structure is needed for the detection device. However, because the current-voltage converters including the operational amplifiers are used to change current signals into voltage signals, no phase difference occurs with these converters and thus the angular velocity can be detected simply and precisely in the detection device.

From the same reason as described above, before the driving device receives the monitor signal, it is preferable to change the monitoring signal from a current signal into a voltage signal through a current-voltage converter which comprises an operational amplifier.

Furthermore, a filter device may be provided in a signal transmission line in which the driving signal is generated based on the monitor signal in order to get rid of noise components other than frequency components which are necessary to cause the arms to vibrate. Therefore, the driving signal can be generated without the influence of noise components even if noise components are included in the monitor signal. As a result, the arms is caused to vibrate correctly and the S/N ratio of the driving signal can be improved. The filter device is composed of a band pass filter or a combination of plural low pass filters. If the filter device is composed of the combination of plural low pass filters, the low pass filters are combined so that the phase of the driving signal does not shift.

The signal transmission line from the detecting electrode or the monitor electrode to the current-voltage converter may be shielded with a reference voltage or a grounding voltage of the angular velocity sensor. This structure can prevent outside noise from entering the signal transmission line. Because outside noise is not included in the detection signal or the monitor signal generated by the current-voltage converter, the S/N ratio of the angular velocity sensor can be improved.

It is preferable that the arrangement of the driving electrode, monitor electrode and detecting electrode attached to the each arm be symmetrical to each other and that the wiring for these electrodes also be symmetrical. According to this structure, each arm is vibrated under the same conditions and the detection signal is obtained from each arm under the same conditions. Therefore, by merging these detection signals using a differential amplifier or the like, noise components are canceled and a detection signal doubles in amplitude in correspondence with the Coriolis force generated in each arm.

A plurality of monitor electrodes may be attached on each arm. In this case, one of the plurality of monitor electrodes is used to generate the monitor signal and the rest are held to the reference voltage of the monitor signal or the grounding voltage of the angular velocity sensor. According to this structure, monitor electrodes not used for generating the monitor signal can shield the driving electrode from the detecting electrode. Therefore, the monitor electrodes can prevent the driving signal from affecting the detection signal.

It is preferable that gaps between adjacent electrodes on the arms are set to 0.1 mm or more. This is because migration easily takes place if the gaps is shorter than that.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIGS. 4A to 4E are views illustrating a structure of the vibrator, in which FIG. 4A is a front elevational view, FIG. 4B is a left side elevational view, FIG. 4C is a right side elevational view, FIG. 4D is a rear elevational view and FIG. 4E is a top plan view;

FIG. 11A to 11D are views illustrating a structure of vibrator shown in FIG. 10A, in which FIG. 11A is a front elevational view, FIG. 11B is a left side elevational view, FIG. 11C is a right side elevational view, and FIG. 11D is a rear elevational view;

FIG. 17A and 17B are elevational views illustrating a structure of the angular velocity sensor of the fourth embodiment, in which FIG. 17A is a front view and FIG. 17b is a side view;

FIGS. 24A to 24E are views illustrating a structure of the vibrator of the seventh embodiment, in which FIG. 24A is a front elevational view, FIG. 24B is a left side elevational view, FIG. 24C is a right side elevational view, FIG. 24D is a rear elevational view and FIG. 24E is a top plan view;

DETAILED DESCRIPTION OF THE PREFERRED EMBODIMENTS

Preferred embodiments of the present invention will be described in detail with reference to the attached figures.

(FIRST EMBODIMENT)

Figure 1:
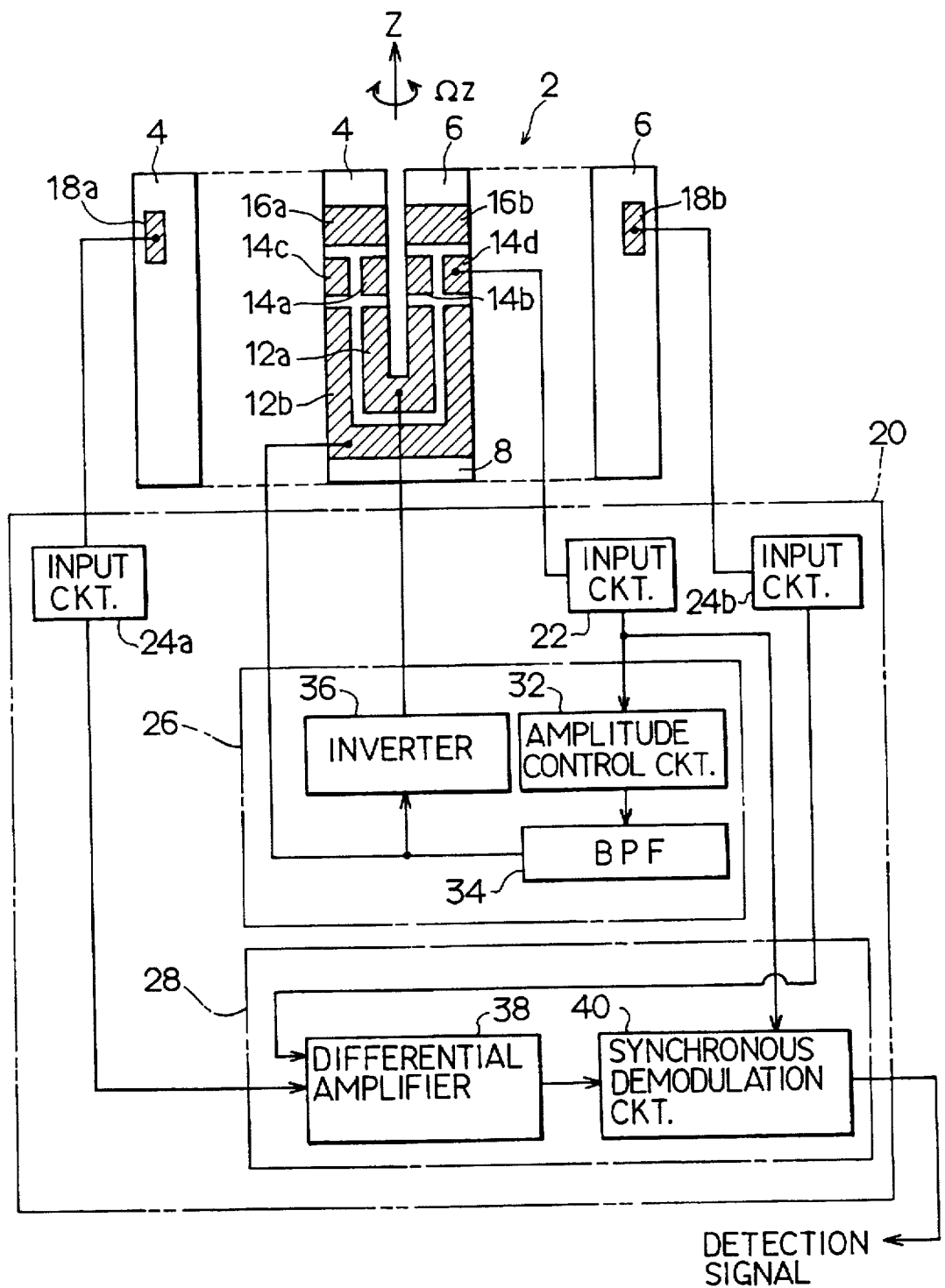
FIG. 1 is a schematic illustration of the overall structure of an angular velocity sensor according to a first embodiment.
Figure 2:
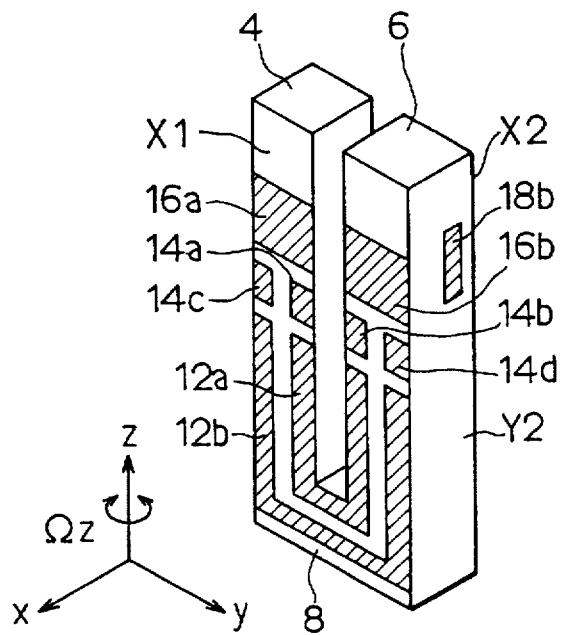
FIG. 2 is a perspective view illustrating a structure of the vibrator of the first embodiment.
Figure 3:
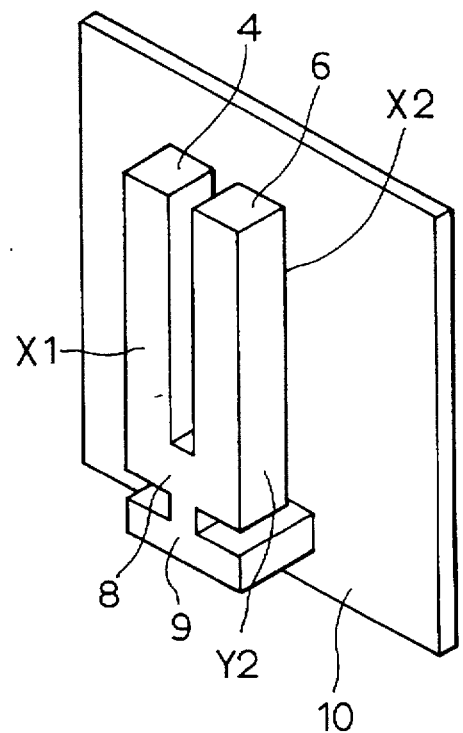
FIG. 3 is a perspective view illustrating the attachment of the vibrator to a substrate.

As shown in FIG. 1, the angular velocity sensor according to the first embodiment comprises a vibrator 2 which has the shape of a tuning fork and to which plural electrodes are attached. A driving and detection circuit 20 causes vibrator 2 to vibrate through the electrodes attached to vibrator 2 and detects an angular velocity Ωz around the z axis shown in FIG. 1 from the vibrations of vibrator 2. Vibrator 2, as shown in FIG. 2 and FIG. 3, has a pair of arms 4 and 6 which are made from piezoelectric material, and a connecting portion 8 connecting one of the ends of arms 4 and 6. A supporting member 9 extends from the center of connecting portion 8 on an opposite side from arms 4 and 6. Vibrator 2 is fixed to a substrate 10 through supporting member 9.

Arms 4 and 6 and connecting portion 8 are each a quadrilateral prism. Vibrator 2 is fixed to substrate 10 so that both U-shaped faces X1 and X2 are parallel to a surface of substrate 10. Ceramic piezoelectric material such as PZT, crystal or the like can be used as a piezoelectric material forming vibrator 2. In the present embodiment, because a polarization direction can be set as desired and manufacturing is easy, PZT is used.

Figure 4A:
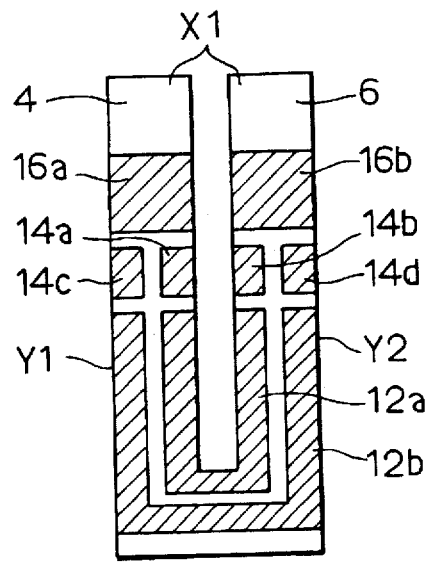
Figure 4B:
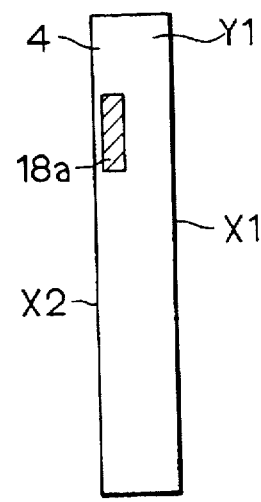

The X1 face shown in FIG. 4A, has attached to it driving electrodes 12a and 12b, monitor electrodes 14a to 14d and electrodes 16a and 16b for polarization, in order, from connecting portion 8 toward the tip. On the Y1 face and Y2 face which are the outer right and left surfaces of arms 4 and 6, as shown in FIGS. 4B and 4C, detecting electrodes 18a and 18b are attached at a position in correspondence with electrodes 16a and 16b. On the X2 face which is a rear face of arms 4 and 6, as shown in FIG. 4D, a common electrode 19 is attached which supplies a reference voltage against driving electrodes 12a and 12b, monitor electrodes 14a to 14d and detecting electrodes 18a and 18b.

Figure 4E:
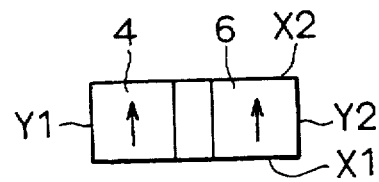
Figure 4C:
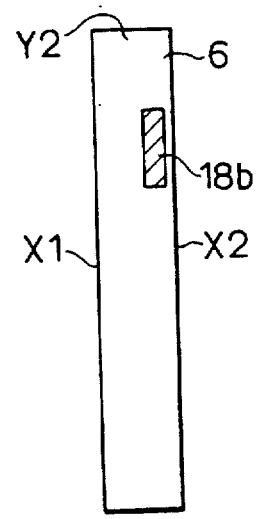
Figure 4D:
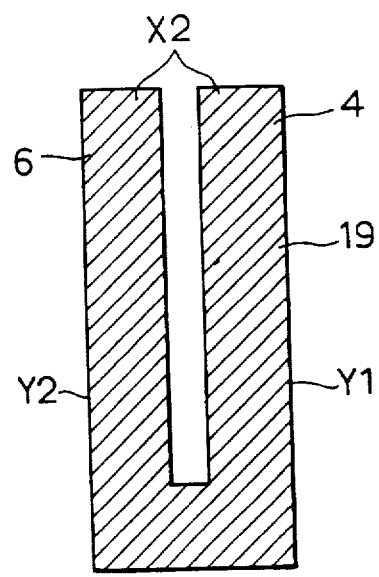

Arms 4 and 6 are polarized along the X axis (shown in FIG. 2), perpendicular to the X1 and X2 faces, as shown by arrows in FIG. 4E, as a result of the electrodes attached on the X1 and X2 faces of arms 4 and 6. Driving electrodes 12a and 12b are formed to be continuous and extend from arm 4 to arm 6 through connecting portion 8. Electrode 12a is provided on the inner side of the X1 face and electrode 12b is provided on the outer side of the X1 face. Monitor electrodes 14a and 14c are attached to arm 4 and monitor electrodes 14b and 14d are attached to arm 6. Detecting electrodes 18a and 18b are attached at a position close to the X2 face on the Y1 and Y2 faces of arms 4 and 6. All gaps between adjacent electrodes attached to the surface of vibrator 2 are set to 0.1 mm or more.

When alternating voltages having a phase difference of 180 degrees are applied to driving electrode 12a and driving electrode 12b, respectively, arms 4 and 6 vibrate in the direction of the Y axis (shown in FIG. 2) which is parallel to a plane containing arms 4 and 6. Vibrations from arms 4 and 6 are detected by the electric current flowing between monitor electrodes 14a to 14d and common electrode 19. In addition, when an electric current flowing between detecting electrodes 18a and 18b and common electrode 19 is detected, vibrations of arms 4 and 6 along the X axis can be detected, and further the angular velocity around the Z axis can be obtained.

In the present embodiment, because detecting electrodes 18a and 18b are formed at a position close to the X2 face on the Y1 and Y2 faces of arms 4 and 6, the vibration of arms 4 and 6 along the X axis and the angular velocity around the Z axis can be detected from the electric current flowing between common electrode 19 and detecting electrodes 18a and 18b. If detecting electrodes 18a and 18b are formed close to the X1 face on the Y1 and Y2 faces of arms 4 and 6, electrodes 16a and 16b could work as reference electrodes for detecting electrodes 18a and 18b. The vibration of arms 4 and 6 along the X axis and the angular velocity around the Z axis could be detected from the electric current flowing between electrodes 16a and 16b and detecting electrodes 18a and 18b.

Next, driving and detection circuit 20 will be explained. Driving and detection circuit 20 includes an input circuit 22 for receiving a monitor signal from one (14d in the present embodiment) of monitor electrodes 14a to 14d. Input circuits 24a and 24b receive detection signals from detecting electrodes 18a and 18b. A self-excited oscillator generates driving signals (alternating voltages) applied to driving electrodes 12a and 12b, using the monitor signal as a reference signal. A detection circuit 28 detects the angular velocity Ωz around the Z axis based on the monitor signal from input circuit 22 and the detection signals from input circuits 24a and 24b. Among monitor electrodes 14a to 14d, monitor electrodes (14a to 14c in the present embodiment) which is not connected to input circuit 22 are connected to substrate 10 with a wire (not shown in the Figure) so that the voltage level thereof becomes the same as that of common electrode 19.

Figure 5:
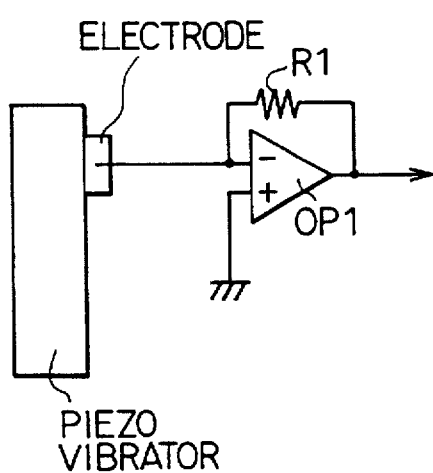
FIG. 5 is a circuit diagram illustrating a structure of an input circuit according to the first embodiment.
Figure 6:
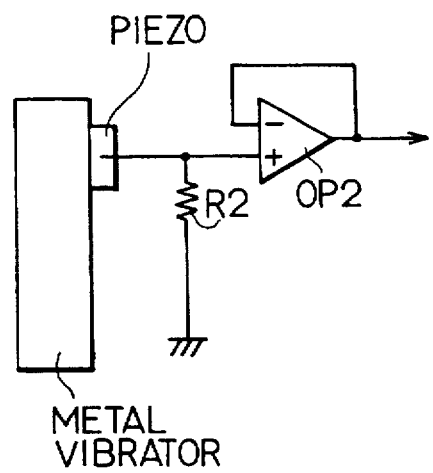
FIG. 6 is a circuit diagram illustrating a structure of an input circuit according to the prior art.

Input circuits 22, 24a and 24b, as shown in FIG. 5, are current-voltage converters including an operational amplifier. A signal line from each electrode is connected to an inverted input terminal of the operational amplifier and the same voltage level as common electrode 19, which is the reference voltage of the electrodes, is applied to a non-inverted input terminal thereof. A resistance R1 for current-voltage conversion is connected between the inverted input terminal and an output terminal of the operational amplifier. This causes the electrostatic capacitance of vibrator 2 to be smaller than that of a vibrator where piezoelectric elements are attached on arms formed by metal, because vibrator 2 of the present embodiment is made from piezoelectric material. If the conventional input circuit shown in FIG. 6 is used for such a piezo-vibrator, a phase difference is created between the actual motion of vibrator 2 and the monitor signal or detection signals, and thus the S/N ratio of the monitor signal or detection signals deteriorates. In the prior art input circuit, a resistance R2 is connected between the piezoelectric element and the common voltage level (GND). One terminal of resistance R2 is connected to a detection circuit through a buffer circuit composed of an operational amplifier OP2. If this input circuit is used for vibrator 2 made from piezoelectric material, because of the small electrostatic capacitance of vibrator 2, noise components are apt to be included in the detection signal and also the phase of the detection signal supplied from the input circuit shifts from the phase of actual vibration of vibrator 2. For these reasons, input circuits 22, 24a and 24b for the monitor signal and detection signals are preferably formed from a current-voltage converter which changes a current signal into a voltage signal with an operational amplifier. This structure makes it possible to obtain the monitor signal and the detection signals without a phase difference from the actual vibration of vibrator 2 and which are less influenced by noise.

Self-excited oscillator 26 comprises an amplitude control circuit 32 (a constant amplitude circuit also can be adopted) which generates the driving signal based on the monitor signal received through input circuit 22, a band pass filter (BPF) 34 for eliminating frequency components higher than the driving frequency and an inverter 36 for inverting the driving signal passing through BPF 34. The driving signal passing through BPF 34 is applied to driving electrode 12b directly and is applied to driving electrode 12a via inverter 36. That is, a phase difference of 180 degrees exists between driving electrodes 12a and 12b. Therefore, noise components included in the driving signal passing through BPF 34 cancel each other when vibrator 2 is vibrated by driving electrodes 12a and 12b, so that vibrator 2 vibrates at a desired frequency.

BPF 34 is used to eliminate high frequency components of the driving signal. The reason that BPF 34 is needed is that the driving signal is subject to the influence of noise components higher than the driving frequency, compared to the case of using the conventional input circuit. BPF 34 can make the angular velocity sensor stable against disturbance, regardless of the structure of the current-voltage converter. BPF 34 can be replaced with a combination of low pass filters. Although, it should be noted that the phase of the driving signal must be kept the same as that of the vibration of vibrator 2.

Detection circuit 28 comprises a differential amplifier 38 which amplifies the difference between the two detection signals supplied through input circuits 24a and 24b, and a synchronous demodulation circuit 40 for receiving the output of differential amplifier 38 and the monitor signal from input circuit 22, and for synchronously demodulating the detection signal using the monitor signal as a reference signal. An output signal from synchronous demodulation circuit 40 shows the angular velocity Ωz around the Z axis. In other words, in detection circuit 28, the two detection signals are turned into signals having the same phase and are combined by differential amplifier 38. As a result, differential amplifier 38 produces an output in which the noise components included in each detection signal are cancelled. When the processed detection signal is applied to synchronous demodulation circuit 40, synchronous demodulation circuit 40 generates the detection signal showing the angular velocity without being affected by the noise components.

As described above, driving electrodes 12a and 12b are attached to arms 4 and 6 of vibrator 2 formed in the shape of a tuning fork. The driving signals for driving electrodes 12a and 12b have a phase difference of 180 degrees. Therefore, no hardness difference between arms 4 and 6 is created during vibration, as is the case with the conventional angular velocity sensor, and thus arms 4 and 6 vibrate stably. In addition, according to the present embodiment, vibrations of vibrator 2 are not transmitted to substrate 10 via connecting portion 8 and supporting member 9. For these reasons, vibrator 2 can be efficiently vibrated by applying a rather low driving voltage to driving electrodes 12a and 12b. Also, the detection signal has reduced noise components, so that the S/N ratio of the angular velocity sensor is improved.

Because driving electrodes 12a and 12b extend between arms 4 and 6 through connecting portion 8, arms 4 and 6 vibrate in a balanced manner. That is, arms 4 and 6 vibrate symmetrically with the same vibration characteristic. As a result, the S/N ratio of the angular velocity sensor does not deteriorate.

Because driving electrodes 12a and 12b, monitor electrodes 14a to 14d, and detecting electrodes 18a and 18b are attached to arms 4 and 6 in order from connecting portion 8 toward the tips of arms 4 and 6, detection circuit 28 can efficiently detect the vibrations of vibrator 2 through detecting electrode 18a and 18b. Furthermore, monitor electrodes 14a to 14d can suppress the influence of the driving signals on detecting electrodes 18a and 18b. For these reasons, the S/N ratio of the angular velocity sensor can be improved as well.

In the present embodiment, monitor electrodes 14a to 14c which are not connected to input circuit 22 are connected to substrate 10 so that the voltage level thereof becomes the same as that of common electrode 19. Therefore, detecting electrodes 18a and 18b are electrically shielded by monitor electrodes 14a to 14c, and therefore more efficiently prevent the driving signals from affecting detecting electrodes 18a and 18b.

In detection circuit 28, the two detection signals are combined by differential amplifier 38. As a result, the noise components included in each detection signal are cancelled. Therefore, the present embodiment can obtain a detection signal showing the angular velocity without being affected by noise components, and thus the S/N ratio thereof can be improved.

Because the input circuits in the driving and detection circuit 20, which receive the monitor signal and the detection signal, are current-voltage converters composed of operational amplifiers, the monitor and detection signals have the same phase as actual vibrations of vibrator 2, and thus the S/N ratio of the angular velocity sensor can be improved.

Furthermore, BPF 34 in the self-excited oscillation improves the driving signal for vibrator 2.

As a result, the angular velocity sensor of the present embodiment has an extremely high S/N ratio and can detect angular velocity $\Omega z$ precisely, regardless of the fact that vibrator 2 is made from piezoelectric material.

In the present embodiment, gaps between adjacent electrodes on vibrator 2 are set to 0.1 mm or more. This is because electromigration easily takes place if the gaps are short. The electromigration deteriorates reliability of the sensor. The gaps set to 0.1 mm or more can prevent electromigration from taking place.

Figure 7:
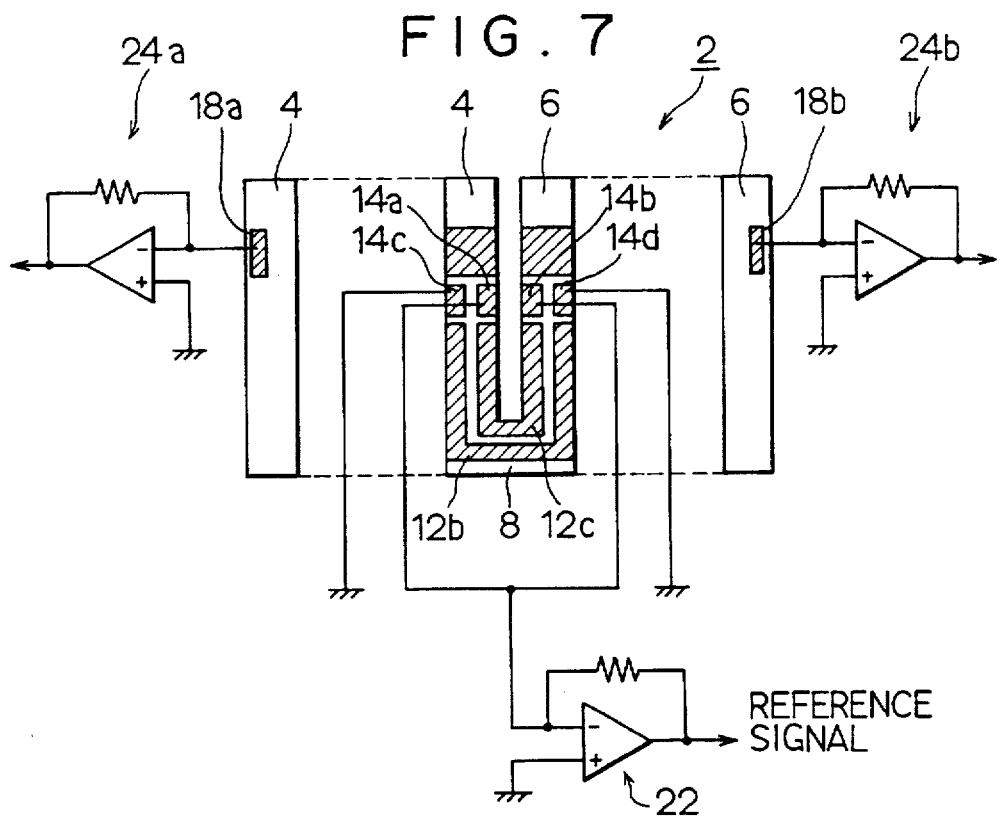
FIG. 7 is a schematic illustration of a modification of wiring connected to the electrodes.

As mentioned above, monitor electrode 14d is used to generate the monitor signal. The rest of monitor electrodes 14a to 14c are held to the same voltage as common electrode 19. Monitor electrodes 14a to 14c electrically shield detecting electrodes 18a and 18b. However, as shown in FIG. 7, monitor electrodes 14a and 14b (monitor electrodes 14c and 14d may alternatively be chosen) may be connected to input circuit 22, and monitor electrodes 14c and 14d (monitor electrodes 14a and 14b may alternatively be chosen) may be connected to the common voltage line (GND) of substrate 10 so that the voltage level of monitor electrodes 14c and 14d are held to the common voltage level. Because the signal lines in arms 4 and 6 are completely symmetrical, the S/N ratio of the angular velocity sensor can be improved. That is, a capacitance between driving electrodes 12a and 12b and detecting electrodes 18a and 18b, or the coefficient of elasticity, varies with the connections of the signal lines. Asymmetry between arms 4 and 6 deteriorates the S/N ratio of the angular velocity sensor. For this reason, the electrodes on arms 4 and 6 are formed symmetrically so that arms 4 and 6 are symmetric. However, when the monitor signal is supplied by one of monitor electrodes 14a to 14d, and the others are held to the common voltage level, asymmetry is created between arms 4 and 6, and the S/N ratio of the angular velocity sensor is deteriorated. Therefore, it is preferable to make connections of the signal lines of arms 4 and 6 symmetric.

Figure 8:
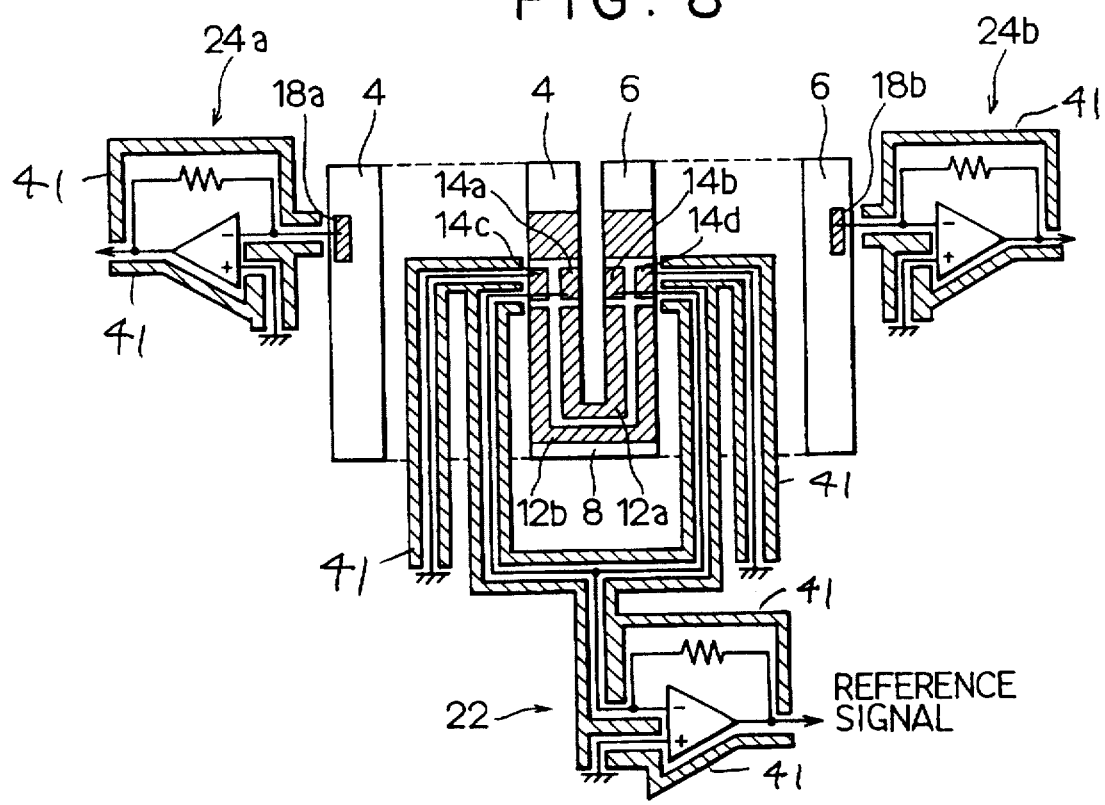
FIG. 8 is a schematic illustration of another modification in which the signal transmission lines from the electrodes to the input circuits are shielded by shielding electrodes.

As shown in FIG. 8, if wires from detecting electrodes 18a and 18b and monitor electrodes 14a to 14b to input circuits 22, 24a and 24b, or wires from monitor electrodes 14c and 14d to GND on substrate 10 are shielded by electrodes 41, noise components, which are caused by capacitive coupling, can be reduced and the S/N ratio of the sensor can be improved. Shielding electrodes 41 can be held to the common voltage level or grounding voltage level.

Figure 9:
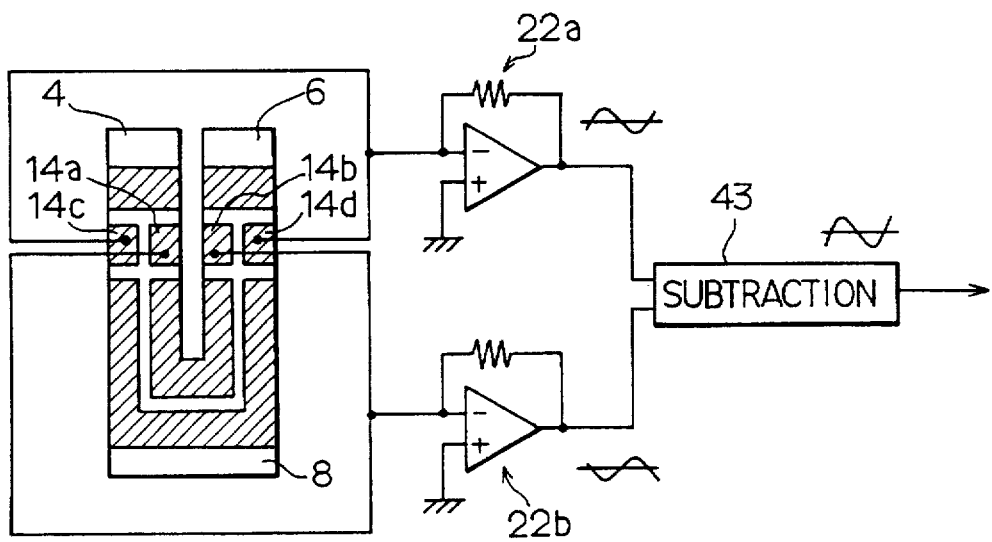
FIG. 9 is a schematic illustration of another modification of a processing circuit for the monitor signal.

In vibrator 2 of the present embodiment, because the polarization directions of arms 4 and 6 are the same, the signals from monitor electrodes 14a and 14b and the signals from monitor electrodes 14c and 14d have an inverse phase when driving electrodes 12a and 12b are energized. For this reason, as shown, for example, in FIG. 9, input circuits 22a and 22b join monitor signals having the same phase by connecting monitor electrodes 14a and 14b to input circuit 22b and monitor electrodes 14c and 14d to input circuit 22a. Then, monitor signals which are the inverse phase of each other are applied to subtraction circuit 43. Therefore, the amplitude of the monitor signal is enlarged by subtraction circuit 43. When this enlarged monitor signal is applied to self-excited oscillator 26 and detection circuit 28, only the vibration components along the Y axis, which correspond to the vibrating direction of vibrator 2, are obtained from the enlarged monitor signal and the vibration components other than those along the Y axis are cancelled out as noise components. Accordingly, by combining the monitor signals, a stable and precise monitor signal can be obtained.

Figure 10A:
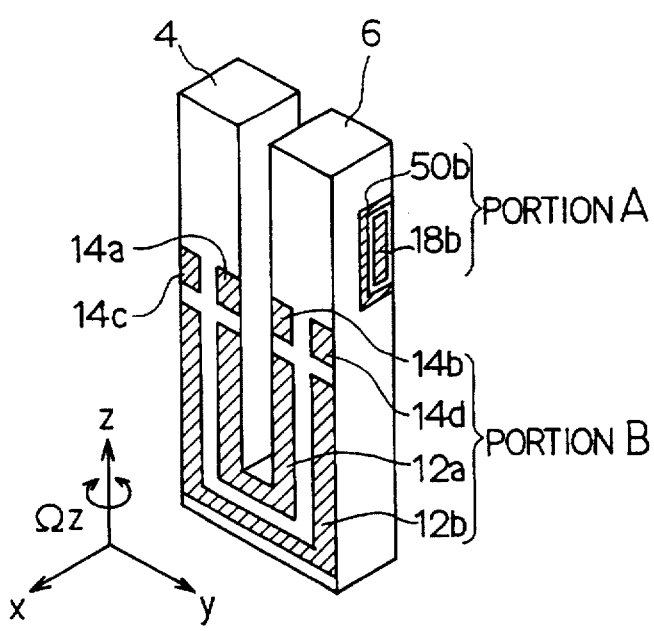
FIG. 10A is a perspective view illustrating a structure in which shielding electrodes are provided around a detecting electrode.
Figure 10B:
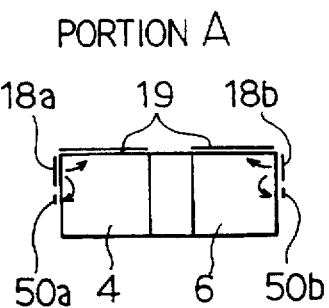
FIG. 10B is a schematic illustration of a direction of polarization of the piezoelectric material.
Figure 10C:
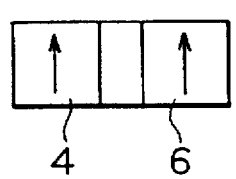
FIG. 10C is a schematic illustration of a direction of polarization of the piezoelectric material.
Figure 11A:
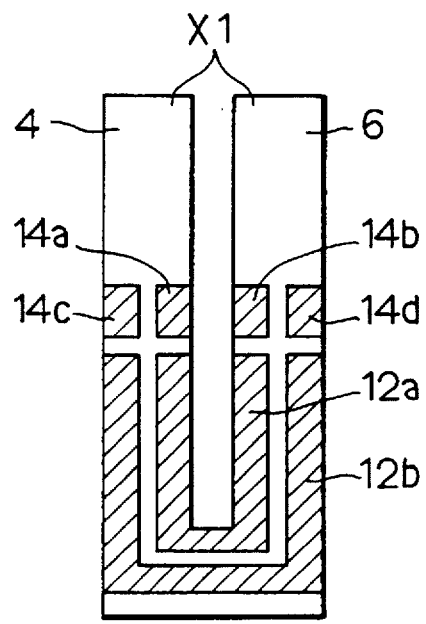
Figure 11B:
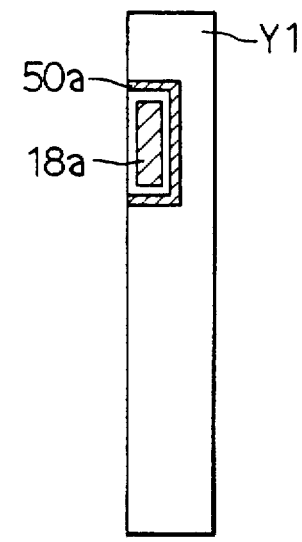
Figure 11C:
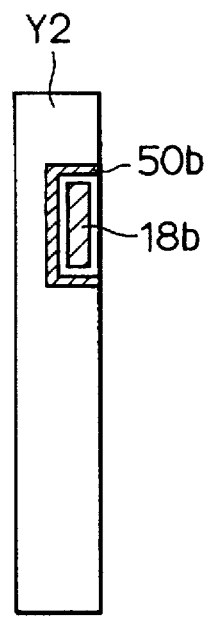
Figure 11D:
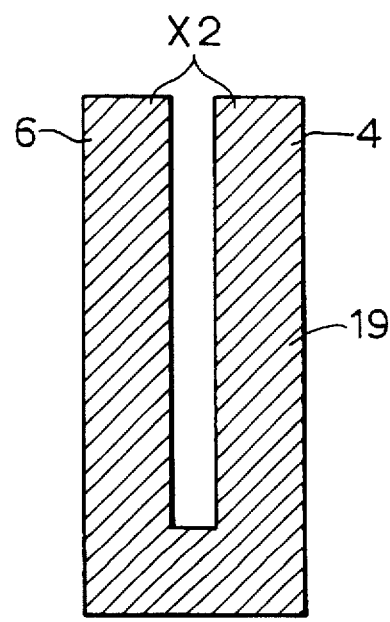

In the present embodiments, detecting electrodes 18a and 18b are attached on the Y1 and Y2 faces of arms 4 and 6. However, as shown, for example in FIGS. 10A to 10C and FIGS. 11A to 11D, if detecting electrodes 18a and 18b on the Y1 and Y2 faces are surrounded with shielding electrodes 50a and 50b connected to common electrode 19, detecting electrodes 18a and 18b can be protected from the driving signals, and the S/N ratio of the sensor can be improved. In this case, as shown in FIGS. 10A to 10C, the polarization direction in a portion B of arms 4 and 6, where driving electrodes 12a and 12b and monitor electrodes 14a to 14d are attached, corresponds to a direction from the X1 face to the X2 face. In a portion A of arms 4 and 6, where detecting electrodes 18a and 18b and shielding electrodes 50a and 50b are attached, the polarization direction corresponds to a direction from detecting electrodes 18a and 18b to the corresponding shielding electrodes 50a and 50b and common electrode 19. Electrodes 16a and 16b, which are attached on the X1 face opposite detecting electrodes 18a and 18b, are unnecessary.

(SECOND EMBODIMENT)

Figure 12:
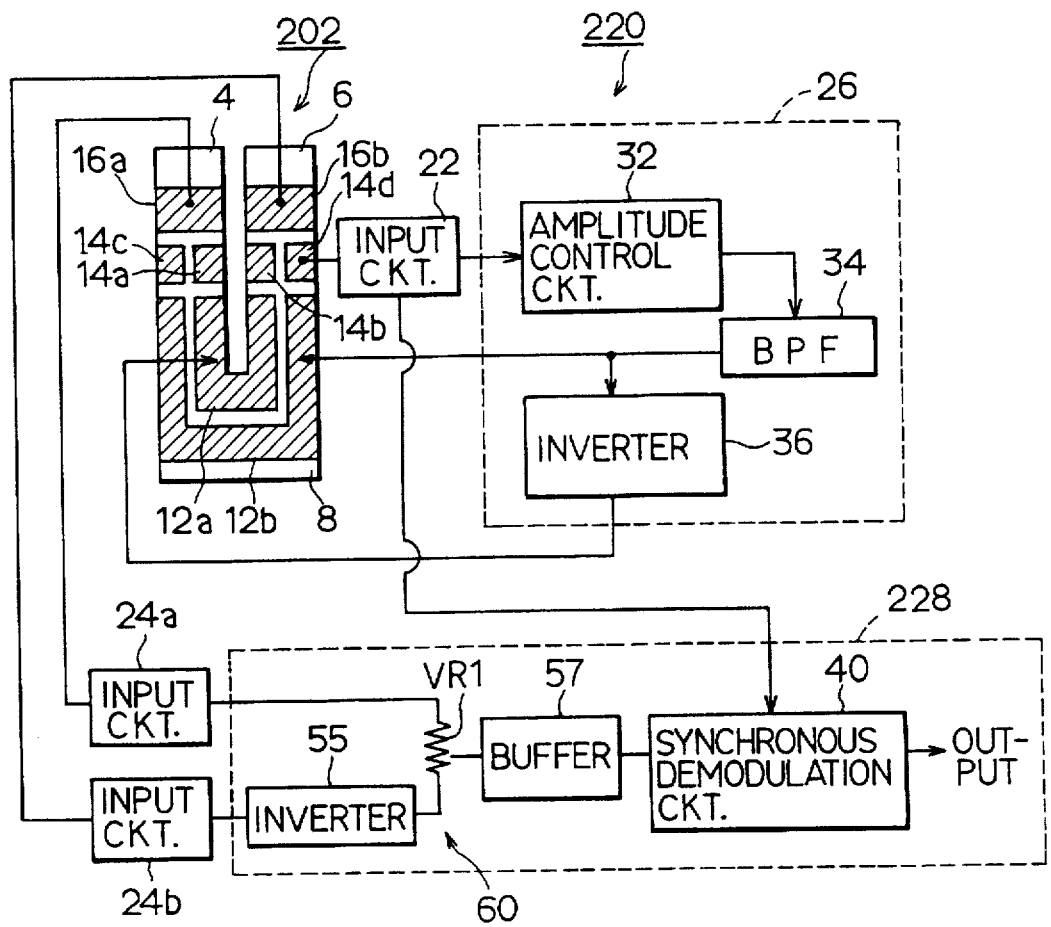
FIG. 12 is a schematic illustration of a structure of an angular velocity sensor according to a second embodiment.
Figure 13:
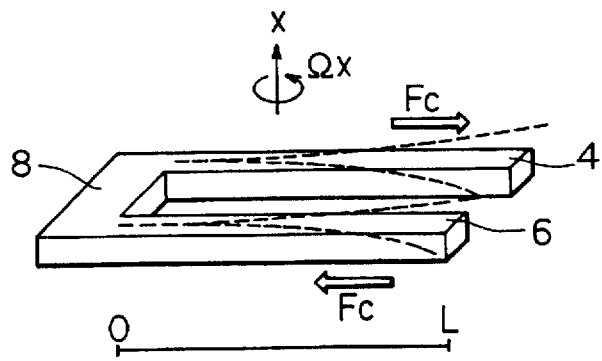
FIG. 13 is a schematic illustration of the detecting theory of the angular velocity in the second embodiment.

Next, the second embodiment of the present invention will be described with reference to FIGURE 12 and FIG. 13. In the second embodiment, the angular velocity sensor detects the angular velocity around the X axis which is at a right angle to the X1 and X2 faces of vibrator 202.

Vibrator 202 of the second embodiment is formed almost the same as vibrator 2 of the first embodiment. The only difference between them is that, in the second embodiment, detecting electrodes 18a and 18b are eliminated from the Y1 and Y2 faces of arms 4 and 6. Electrodes 16a and 16b, attached on the X1 face of vibrator 202 are used as detecting electrodes. That is, the angular velocity sensor is different from the angular velocity sensor of the first embodiment, which detects the angular velocity $\Omega z$ around the Z axis from the vibrations of arms 4 and 6 in the direction of the X axis, in that it detects the angular velocity $\Omega x$ around the X axis as shown in FIG. 13. If the angular velocity $\Omega x$ around the X axis acts on vibrator 202, a Coriolis force is induced by the angular velocity $\Omega x$. The Coriolis force provides arms 4 and 6 in opposite directions from each other along the Y axis. Voltage signals in proportion to the angular velocity $\Omega x$ are induced in detecting electrodes 16a and 16b by a compressive stress or a tensile stress applied to arms 4 and 6 in response to the vibration of arms 4 and 6 along the Y axis. The voltage signals induced in detecting electrodes 16a and 16b are detected as a detection signal.

Driving and detection circuit 220 of the second embodiment has the same structure as that of the first embodiment, i.e., comprises input circuit 22 for receiving the monitor signal from monitor electrode 14d, input circuit 24a and 24b for receiving the detection signals from electrodes 16a and 16b employed as detecting electrodes, self-excited oscillator 26 and detection circuit 228. Input circuits 22, 24a and 24b and self-excited oscillator 26 are structured in the same way as the first embodiment, but detection circuit 228 is a little different from detection circuit 28 of the first embodiment. That is, in the second embodiment, a signal processing circuit 60 comprises an inverter 55, a variable resistance VR1 and a buffer 57, instead of operational amplifier 38. In signal processing circuit 60, the detection signal passing through input circuit 24b is inverted by inverter 55, and then the inverted signal is applied to one end of variable resistance VR1. The detection signal passing through input circuit 24a is applied directly to the other end of variable resistance VR1. The detection signals are joined in variable resistance VR1. The joined detection signal is generated from a movable contact of resistance VR1 and is applied to synchronous demodulation circuit 40 via buffer 57. That is, signal processing circuit 60 turns the two detection signals having opposite phases to each other into signals having the same phase by inverter 55, and joins the signals having the same phase in variable resistance VR1. According to the angular velocity sensor of the second embodiment, when joining the detection signals, by adjusting the value of valuable resistance VR1, it is possible to reduce noise components which cannot be eliminated by simply joining the signals.

(THIRD EMBODIMENT)

Figure 14:
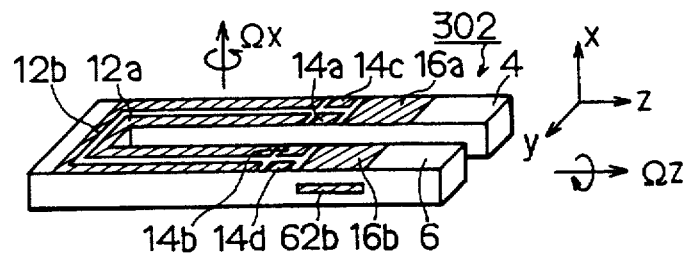
FIG. 14 is a perspective view illustrating a structure of a vibrator of a third embodiment.
Figure 15:
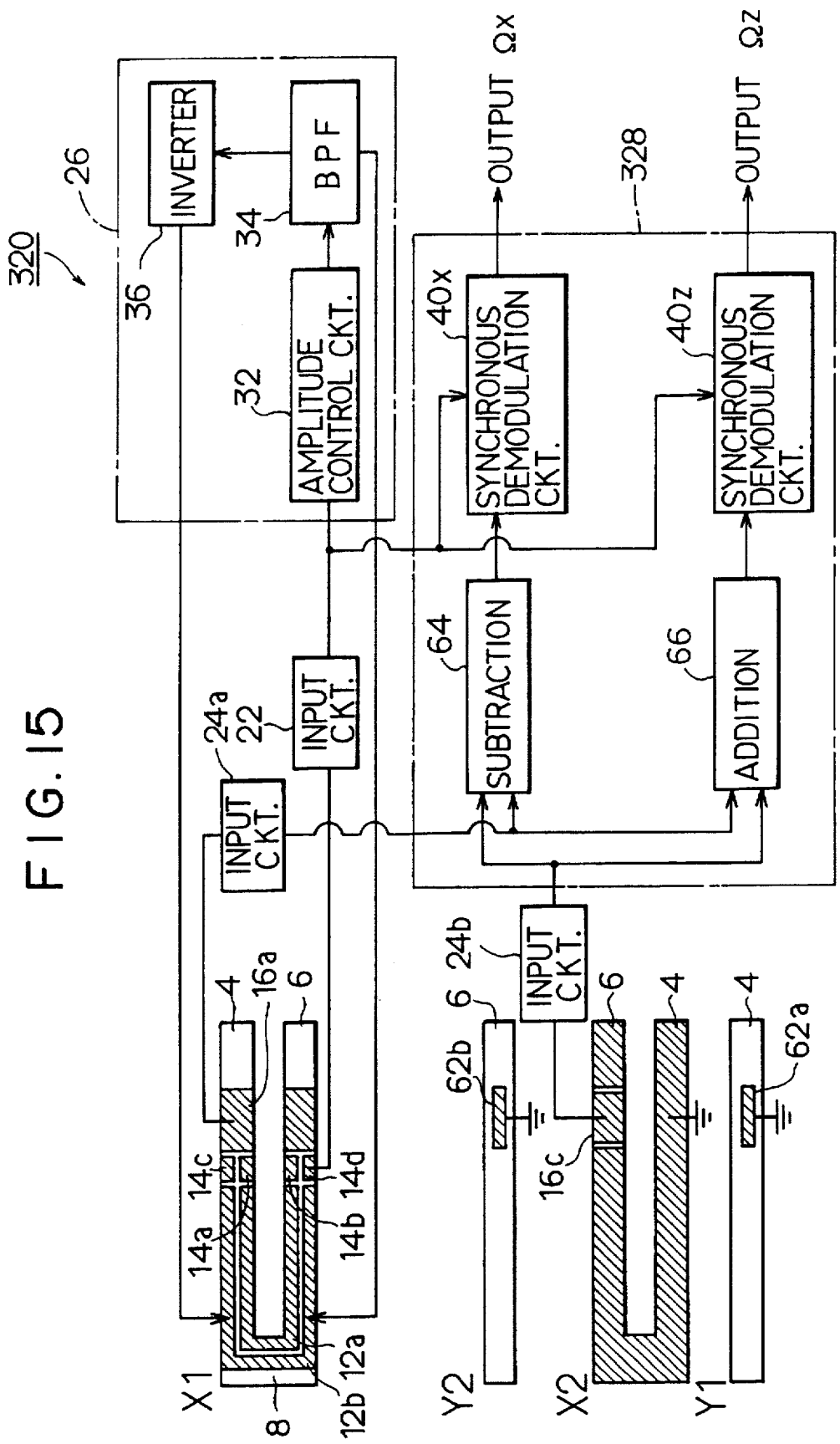
FIG. 15 is a schematic illustration of the overall structure of an angular velocity sensor according to the third embodiment.

Next, the third embodiment of the present invention will be described with reference to FIG. 14 and FIG. 15. In the first embodiment and second embodiment, the angular velocity sensor detects the angular velocity $\Omega z$ around the Z axis or the angular velocity $\Omega x$ around the X axis. However, the angular velocity sensor of the third embodiment can detect the angular velocity $\Omega z$ and the angular velocity $\Omega x$ at the same time using only one vibrator 302.

Vibrator 302 of the third embodiment is formed almost the same as vibrator 2 of the first embodiment. The only difference between them is that detecting electrodes 18a and 18b are eliminated from the Y1 and Y2 faces of arms 4 and 6, common electrodes 62a and 62b, which are held to the same voltage as common electrode 19, are attached at each center position corresponding to electrodes 16a and 16b on the Y1 and Y2 faces, and further electrode 16c is attached at a position corresponding to electrode 16b on the X2 face of arm 6. In the third embodiment, electrode 16a on the X1 face of arm 4 and electrode 16c on the X2 face on arm 6 are used as detecting electrodes.

Driving and detection circuit 320 of the third embodiment has the same structure as that of the first embodiment. That is, it comprises input circuit 22 for receiving the monitor signal from monitor electrode 14d, input circuits 24a and 24b for receiving the detection signals from electrodes 16a and 16c employed as detecting electrodes, self-excited oscillator 26 and detection circuit 328. Input circuits 22, 24a and 24b and self-excited oscillator 26 are structured in the same way as the first embodiment, but detection circuit 328 is different from detection circuit 28 of the first embodiment. That is, in the third embodiment, detection circuit 328 comprises a subtraction circuit 64 for subtracting one detection signal from the other detection signal, an addition circuit 66 for adding these detection signals, a synchronous demodulation circuit 40x for synchronously demodulating the output of subtraction circuit 64 using the monitor signal passing through input circuit 22 as a reference signal, and a synchronous demodulation circuit 40z for synchronously demodulating the output of addition circuit 66 using the monitor signal passing through input circuit 22 as a reference signal.

As described above, because electrode 16a and electrode 16c used as the detecting electrodes are attached on different faces (X1 face and X2 face) of arms 4 and 6, respectively, when the angular velocity $\Omega z$ around the Z axis acts on vibrator 302, signals having the same phase are generated from electrodes 16a and 16c. On the other hand, when the angular velocity $\Omega x$ around the X axis acts on vibrator 302, signals having an opposite phase are generated from electrodes 16a and 16c, because a compressive stress and a tensile stress are applied to arms 4 and 6, respectively. Therefore, the output of subtraction circuit 64 doubles while an angular velocity $\Omega x$ around the X axis acts on vibrator 302. On the contrary, the output of subtraction circuit 64 is zero while an angular velocity $\Omega z$ around the Z axis is applied to vibrator 302. The output of addition circuit 66 doubles while an angular velocity $\Omega z$ around the Z axis acts on vibrator 302. On the contrary, the output of addition circuit 66 is zero while an angular velocity $\Omega x$ around the X axis is applied to vibrator 302.

For these reasons, the angular velocity sensor of the third embodiment can detect the angular velocity $\Omega x$ around the X axis by means of subtraction circuit 64 and synchronous demodulation circuit 40x and angular velocity $\Omega z$ around the Z axis by means of addition circuit 66 and synchronous demodulation circuit 40z.

(FOURTH EMBODIMENT)

Figure 16:
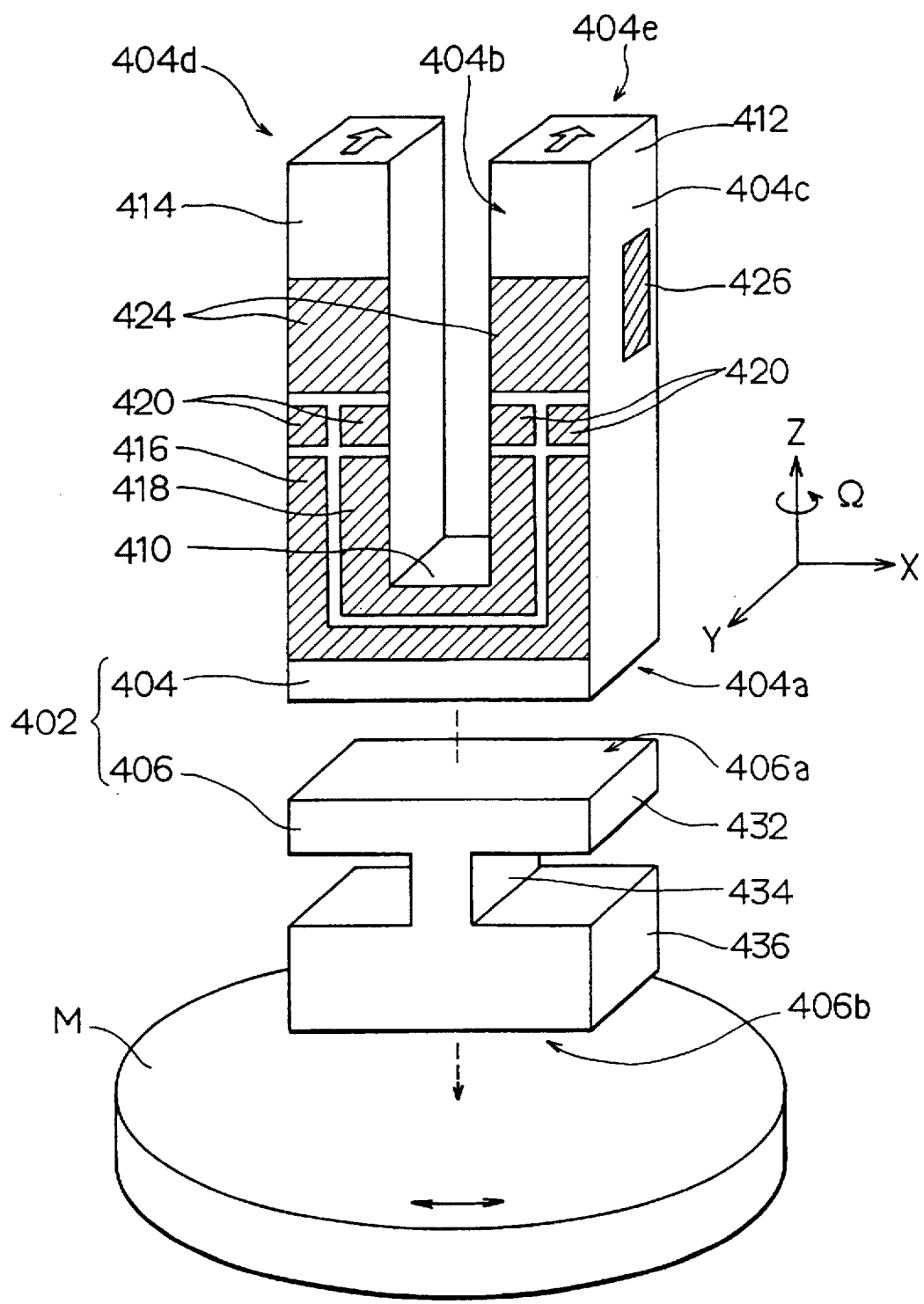
FIG. 16 is a perspective view illustrating a structure of an angular velocity sensor of a fourth embodiment.
Figure 17A:
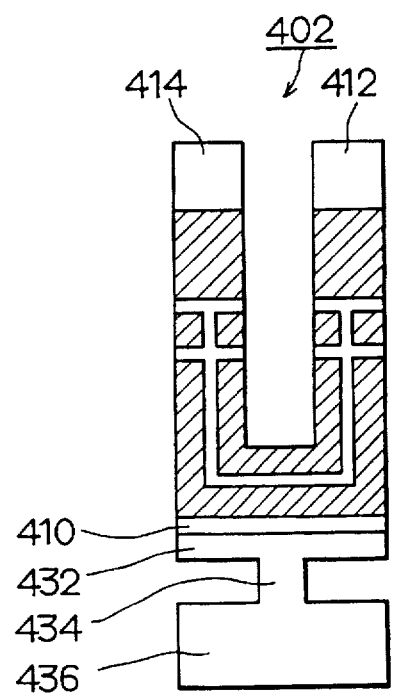
Figure 17B:
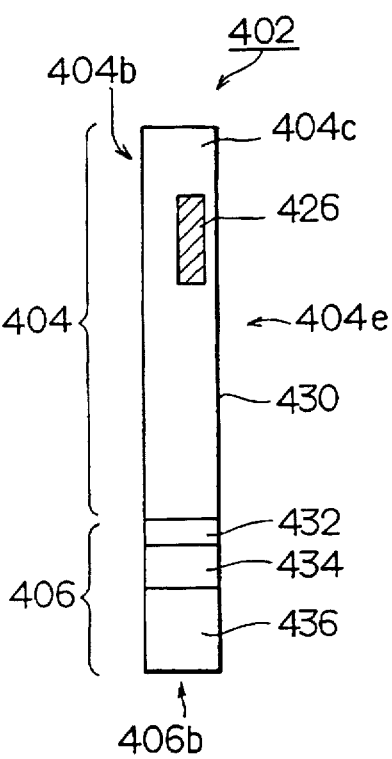

Next, the fourth embodiment of the present invention will be described with reference with FIG. 16 and FIGS. 17A and 17B. As shown in FIGS. 16, 17A and 17B, angular velocity sensor 402 comprises a vibrator 404 which is made from piezoelectric material and on which electrodes are attached, and a fixing member 406 which is made from stainless steel and is used for fixing vibrator 404 on a detected object M. Vibrator 404, in the shape of a tuning fork, is composed of a base portion 410 having a base face 404a fixed to fixing member 406, and a pair of arms 412 and 414 which are formed in parallel away from base face 404a. A front face 404b (equivalent to the X1 face) of vibrator 404 has several electrodes attached. Vibrating electrodes 416 and 418 vibrate arms 412 and 414 along the X axis so that they approach and go away each other periodically. Monitor electrodes 420 generate a signal in synchronism with the vibrations of vibrator 404. Electrodes 424 control the polarization of vibrator 404.

On a right side face 404c (equivalent to the Y2 face) of vibrator 404, a detecting electrode 426 is attached to generate a detection signal in proportion to an angular velocity $\Omega$. On a left side face 404d (Y1 face) of vibrator 404, another detection electrode 428 is attached to generate the same detection signal as detection electrode 426. In addition, a rear face 404e of vibrator 404 is covered with a common electrode 430. Common electrode 430 is used to control the polarization of vibrator 404 and is held at the grounding voltage level when the angular velocity $\Omega$ is detected. Fixing member 406 includes a connecting portion 432 having a connecting face 406a formed with the same shape as base face 404a, a thin portion 434 which is thinner than connecting portion 406a and is located at the center of connecting portion 406a, and a fixing portion 436 having a fixing face for attaching fixing member 406 to detected object M. A cross section of fixing member 406 is H-shaped. Base face 404a of vibrator 404 and connecting face 406a of fixing member 406 are joined by an adhesive. Further fixing member 406 is fixed to detected object M by means of an adhesive, welding, a screw, brazing or the like.

The thickness of the adhesive layer between base face 404a and connecting face 406a should be 20 μm or less in order to minimize a loss of amplitude in the vibrations of vibrator 404. An experimental result will be mentioned later where the thickness of the adhesive layer was set to 20 μm or less. If the thickness becomes greater, a desired vibration of vibrator 404 cannot be obtained.

In the angular velocity sensor structure described above, driving electrodes 416 and 418, monitor electrodes 420, and electrodes 424 for controlling polarization are set to a voltage having the same DC component. That is, these electrodes are subject to a predetermined voltage against the voltage of common electrode 19 which is a reference voltage. As a result, polarization is controlled to be in the polarization direction shown by arrows in FIG. 16.

Figure 18:
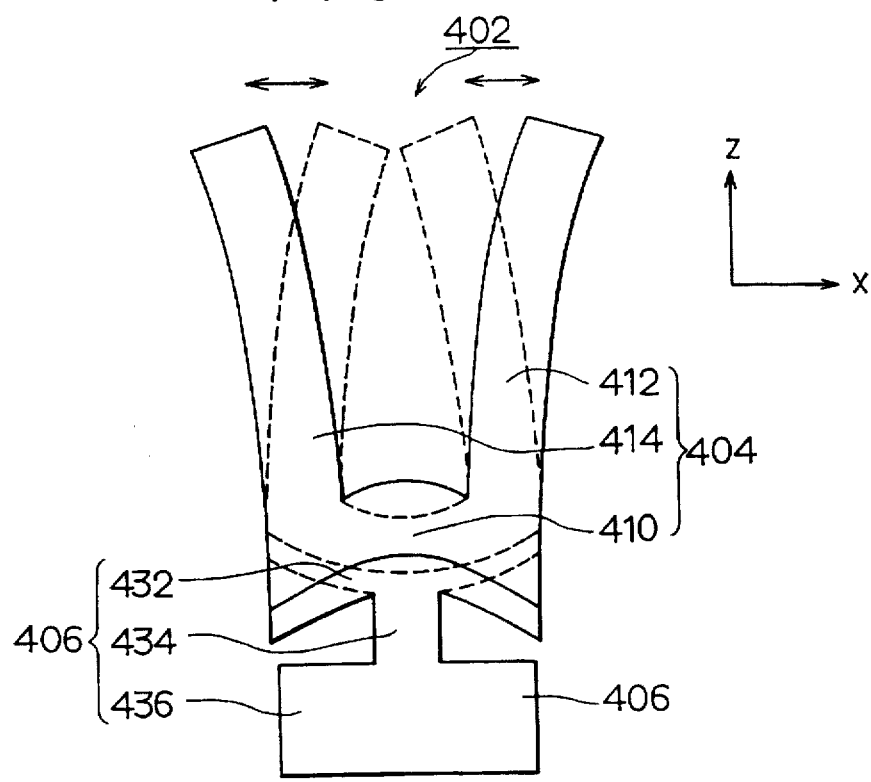
FIG. 18 is a schematic illustration of the motion of the vibrator of the angular velocity sensor.
Figure 19:
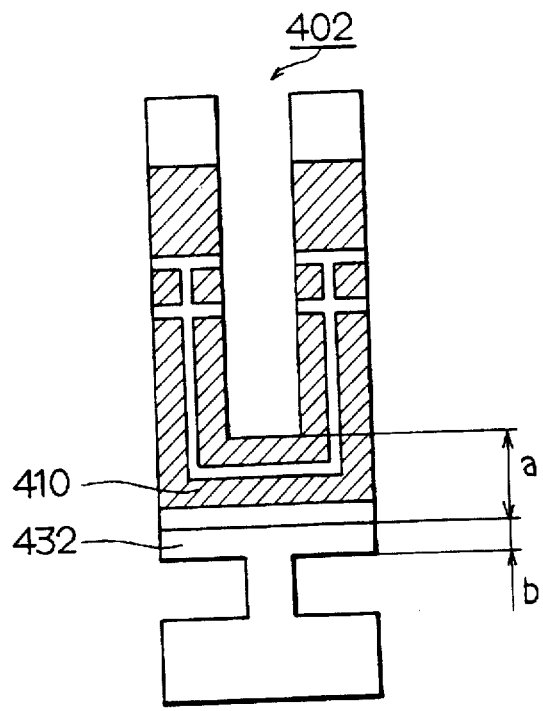
FIG. 19 is a schematic illustration of dimensions of a base portion 410 and connecting portion 432 of a fixing member.

When alternating signals having a predetermined frequency and an inverse phase from each other are applied to driving electrodes 416 and 418 respectively, as shown in FIG. 18, arms 412 and 414 vibrate along the X axis so that they approach and go away from each other repeatedly (hereinafter, referred as a driving vibration). At this time, base portion 410 of vibrator 404 and connecting portion 432 of fixing member 406 joined by the adhesive, are also vibrated. Under this driving vibration, thin portion 434 of fixing member 406 becomes a fulcrum of the vibration. During the driving vibration, one of monitor electrodes 420 generates the monitor signal in synchronism with the vibrations of vibrator 404. This monitor signal is used to keep the driving vibration stable in the same way as with the first embodiment.

During the driving vibration described above, if an angular velocity Ω around the Z axis acts on vibrator 404, a Coriolis force is induced by the angular velocity Ω. The Coriolis force makes arms 412 and 414 vibrate in opposite direction from each other along the Y axis. Voltage signals in proportion to the angular velocity Ω are induced in detecting electrodes 426 and 428 by a compressive stress or a tensile stress applied to arms 412 and 414 in response to the vibration of arms 412 and 414 along the Y axis. The voltage signals induced in detecting electrodes 426 and 428 are detected as a detection signal.

The sensitivity of the detection signal relative to the angular velocity Ω acting on vibrator 404 depends on the amplitude and frequency of the driving vibration. The amplitude of the driving vibration is greatly affected by base portion 410 and connecting portion 432 which vibrate as one body. If connecting faces 404a and 406a between vibrator 404 and fixing member 406 are positioned at rest in a position at which the stress becomes zero during the vibration of base portion 410 and connecting portion 432, the amplitude of the driving vibration is maximized.

Accordingly, in the fourth embodiment, thickness "a" of base portion 410 of vibrator 404 and thickness "b" of connecting portion 432 of fixing member 406 are set so that the relationship in the following equation (1) is satisfied:

$$Ea \times a = Eb \times b \qquad (1)$$

wherein "Ea" is Young's modulus of vibrator 404, and "Eb" is Young's modulus of fixing member 406.

For example, suppose Young's modulus of the piezoelectric material forming vibrator 404 is 50 GPa and the thickness "a" of base portion 410 is 3 mm. Since Young's modulus of the stainless steel forming fixing member 406 is 197 GPa, the thickness "b" of connecting portion 432 should be 0.76 mm. If fixing member 406 is made from copper (Eb=117 GPa), the thickness "b" of connecting portion 433 should be 1.28 mm.

Figure 20:
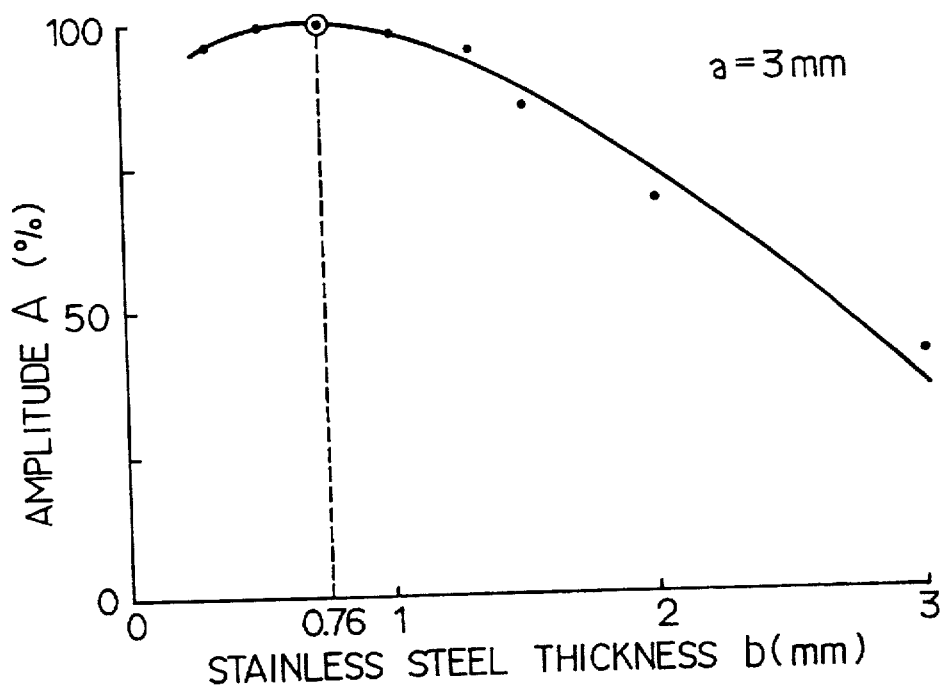
FIG. 20 is a graph illustrating the relationship between the amplitude of the vibrator and the thickness of the connecting portion 432.

FIG. 20 is a graph illustrating the variation in amplitude A during the driving vibration, as thickness "b" of connecting member 432 of fixing member 406 varies. Thickness "a" of base portion 410 is 3 mm. In the graph, amplitude A is shown with relative values in which the amplitude corresponds to 100% when the above equation (1) is satisfied, that is, thickness "b" of connecting portion 432 is 0.76 mm. As shown in FIG. 20, even if the driving voltage supplied to driving electrodes 416 and 418 is constant, the greater the deviation of thickness "b" from the point where the above equation (1) is satisfied (=0.76 mm), the smaller the amplitude A becomes. In other words, vibration energy supplied from driving electrodes 416 and 418 is not used effectively for the driving vibration. Even if fixing member 406 is made from a material other than stainless steel, or thickness "a" of base portion 410 is a value other than 3 mm, the result is the same as that shown in FIG. 20.

Since the angular velocity sensor of the fourth embodiment is structured as explained above, it has the following advantages.

First of all, because fixing member 406 is made from stainless steel which can be easily manufactured, thin portion 434 can be precisely formed at the center of fixing member 406. Therefore, thin portion 434 permits the vibrations of vibrator 404 to be balanced and the fulcrum of the vibrations is created at thin portion 434. The driving vibration is much more stable, and the sensitivity of angular velocity sensor 402 can be kept constant.

Furthermore, since thickness "b" of connecting portion 432 is set based on the above equation (1) so that amplitude A during the driving vibration is maximized, the sensitivity of sensor 402 can be improved.

In the fourth embodiment, thickness "a" of base portion 410 and thickness "b" of connecting portion 432 are set according to the above equation (1). However, when thickness "a" of base portion 410 is small or Young's modulus "Eb" of fixing member 406 is large, thickness "b" of connecting portion 432 becomes very small. This might be impossible because of difficulties in manufacturing or problems with the strength of connecting portion 32. Accordingly, an acceptable range of thickness "a" of base portion 410 and thickness "b" of connecting portion 432 has been examined by the inventors, and the following equation (2) produces acceptable results:

$$b/(a+b) \times Eb/Ea (=1.2 \qquad (2)$$

If the dimensions and materials from the example above are applied to equation (2), the thickness "b" of connecting portion 432 is 1.33 mm or less, allowing thickness "b" to be as much as nearly twice the value of 0.76 mm calculated using equation (1). By designing thickness "b" of connecting portion 432 using the equation (2), it is possible to manufacture fixing member 406 easily. Equation (2) was determined experimentally from measurements such as shown in FIG. 20. Even if fixing member 406 is made from a material other than stainless steel (e.g., copper), equation (2) is applicable.

(FIFTH EMBODIMENT)

Next, the fifth embodiment of the present invention will be explained with reference to FIGURE 21.

Figure 21:
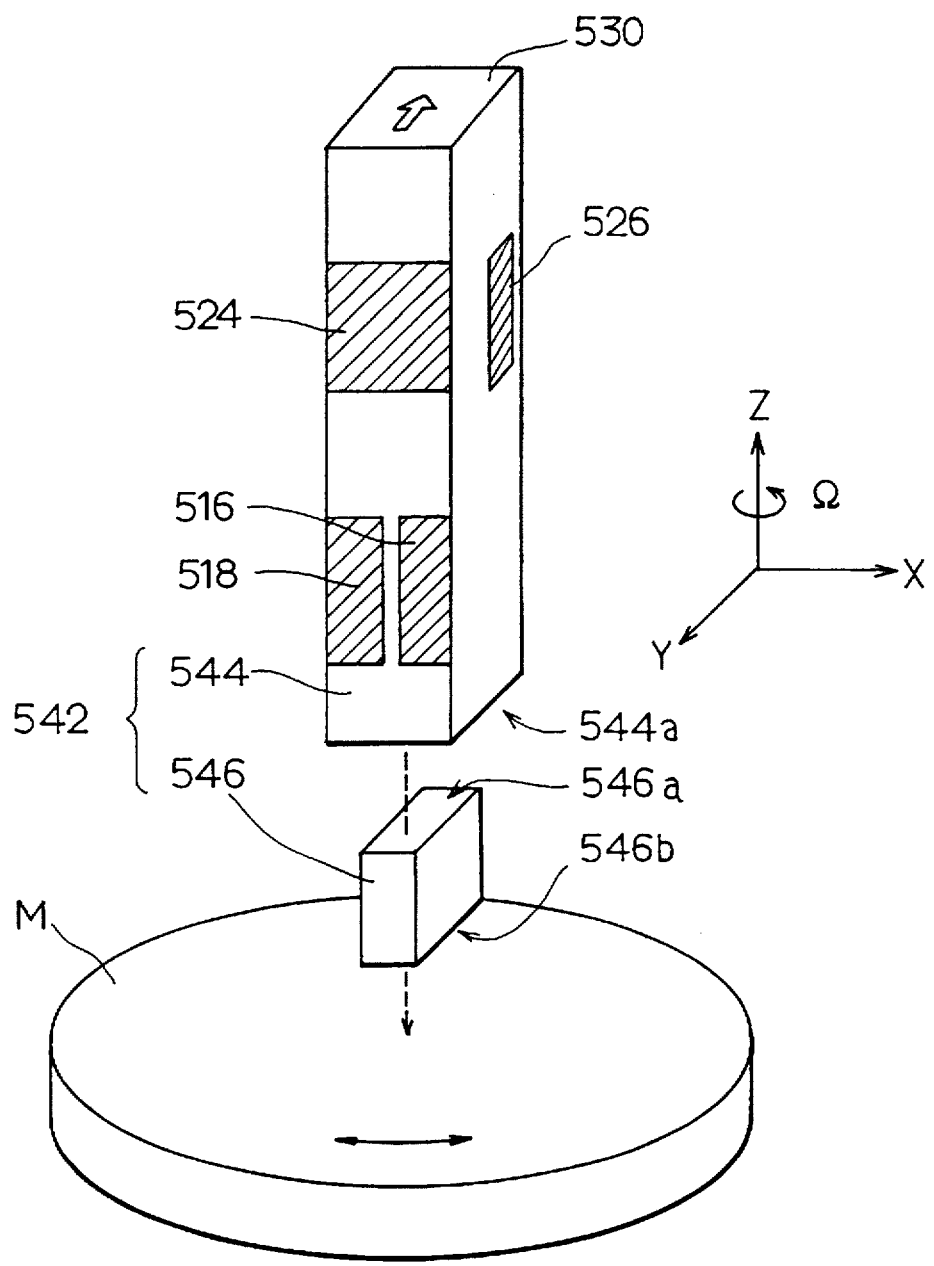
FIG. 21 is a perspective view illustrating a structure of an angular velocity sensor of a sixth embodiment.

As shown in FIG. 21, the angular velocity sensor 542 of the fifth embodiment comprises a vibrator 544 made from piezoelectric material, on which various electrodes are attached, and a fixing member 546 made from stainless steel and disposed between vibrator 544 and a detected object M to fix vibrator 544 onto the detected object M. Vibrator 544 is formed as a rectangle prism and has attached to it a driving electrode 516, a monitor electrode 518, a polarization electrode 524, a detecting electrode 526 and a common electrode 530, which have the same functions as correspondingly named electrodes of the fourth embodiment.

Fixing member 546 is a rectangular prism having a width along the X axis narrower than the width of base face 544a of vibrator 544. A connecting face 546a of fixing member 546 is attached to base surface 544a of vibrator 544 by adhesive so that fixing member 546 is positioned at the center of vibrator 544. Further, a fixing face 546b of fixing member 546 is attached to the detected object M.

Angular velocity sensor 542 is polarized so that the polarization direction becomes the direction shown by the arrow in FIG. 21, in the same way as the fourth embodiment. When alternating signals with a predetermined frequency are applied to driving electrode 516, fixing member 546 becomes a fulcrum for vibrations and vibrator 544 vibrates along the X axis (referred as the driving vibration). During the driving vibration, when an angular velocity $\Omega$ around the Z axis is applied, vibrator 544 vibrates along the Y axis in the same way as the fourth embodiment. Therefore, a detection signal in proportion to the angular velocity $\Omega$ can be obtained from detecting electrode 526.

According to the fifth embodiment, since the entire fixing member 546 works in the same way as thin portion 434 of the fourth embodiment, the angular velocity sensor can be manufactured more easily. That is, just by attaching the simply shaped fixing member 546 to vibrator 544, the position of the fulcrum will stay at a nearly constant position, and vibrator 544 will vibrate stably.

Figure 22A:
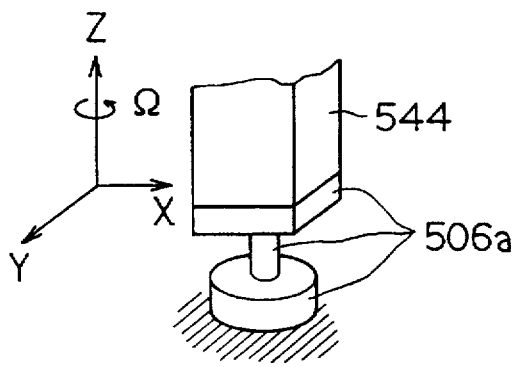
FIGS. 22A to 22E are perspective views illustrating modifications of the fixing member 506.
Figure 22D:
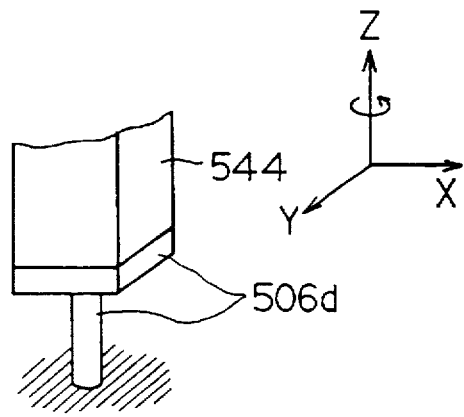
Figure 22B:
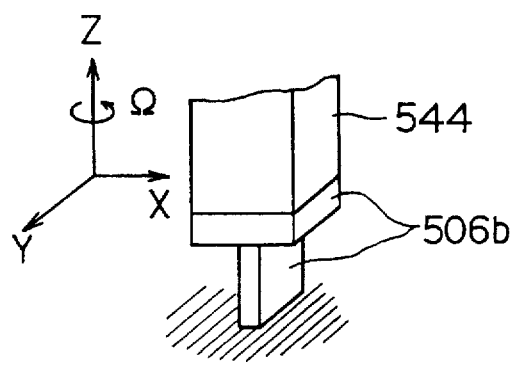
Figure 22E:
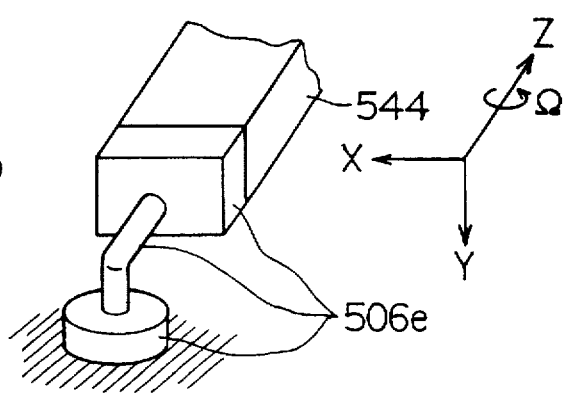
Figure 22C:
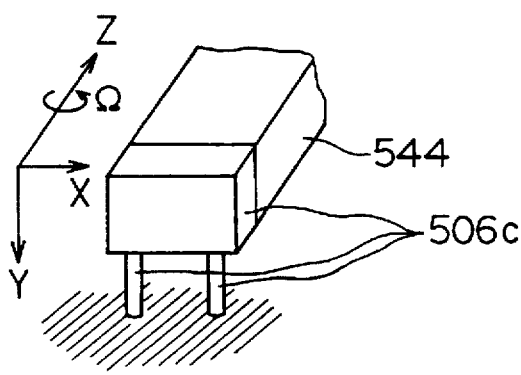

The fifth embodiment includes a modification of fixing member 546 as compared to previous embodiments. However, the shape of fixing member 546 is not limited to the above examples. For instance, the fixing member can have various shapes as shown in FIGS. 22A through 22E. That is, the shape of thin portion 434 or fixing portion 436 is rectangle in cross section according to the above embodiments, but any portion of the fixing member can be circular as shown by fixing members 506a, 506d and 506e in FIGS. 22A, 22D and 22E, respectively. In other words, any shape can be used for thin portion 434 or fixing member 436, as long as it is symmetrical in the direction of the driving vibration. In addition, thin portion 434 includes just one member in the fourth embodiment. However, providing two or more thin portions is possible as long as the thin portions are disposed within a predetermined range narrower than the width of vibrator 504 and are disposed to be bilaterally symmetric. Furthermore, as shown in FIGS. 22B, 22C and 22D, fixing members 506b, 506c and 506d do not have fixing portions at their bases. As shown in FIGS. 22C and 22E, vibrator 544 can be disposed so that base face 544a of vibrator 544 and the surface of the detected object M are at right angles.

(SIXTH EMBODIMENT)

Next, the sixth embodiment of the present invention will be mentioned with reference to the figures.

Figure 23A:
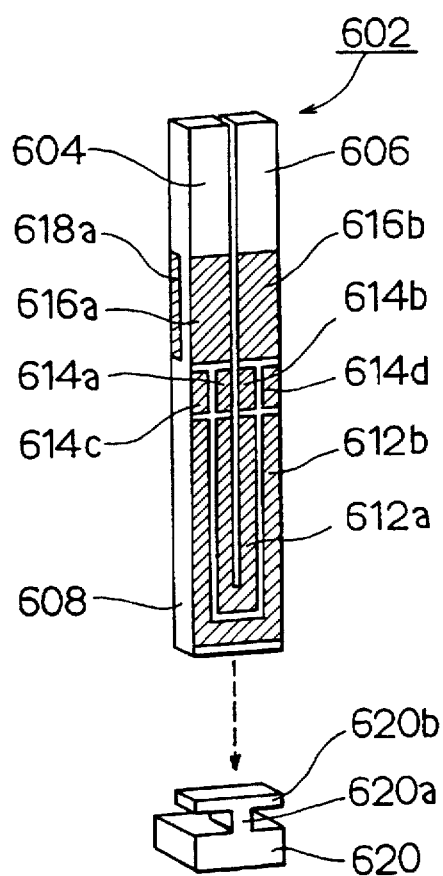
FIGS. 23A and 23B are perspective views illustrating the method of connecting the vibrator and the fixing member in a seventh embodiment.
Figure 23B:
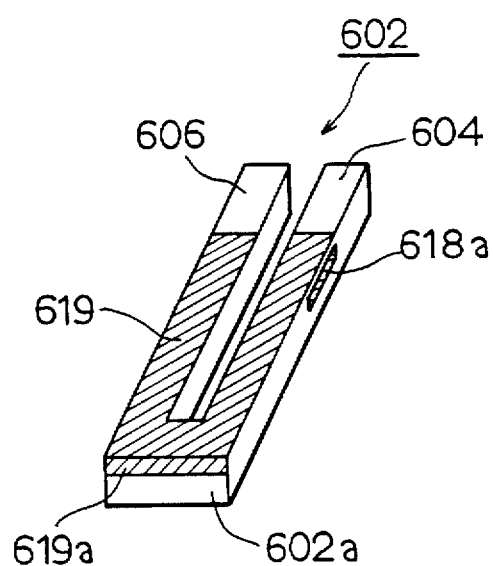
Figure 24A:
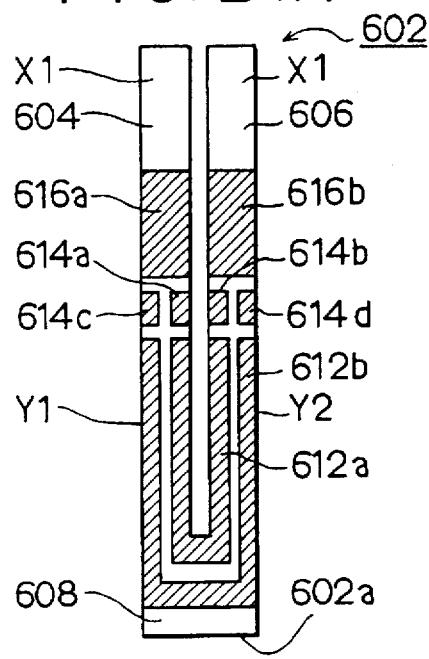
Figure 24B:
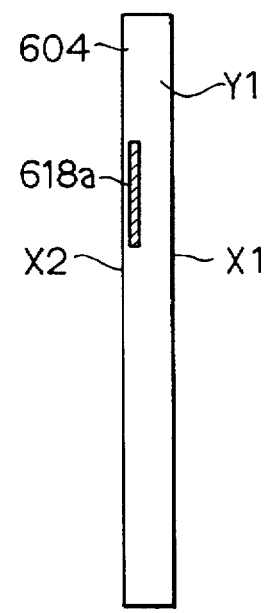
Figure 24E:
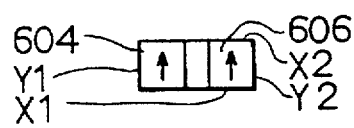
Figure 24C:
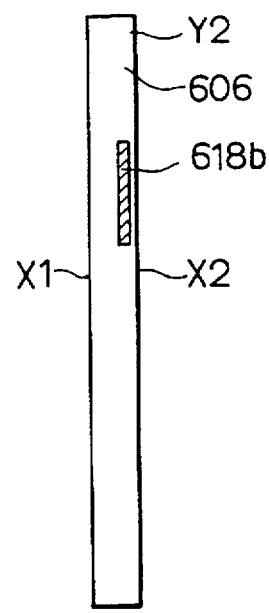
Figure 24D:
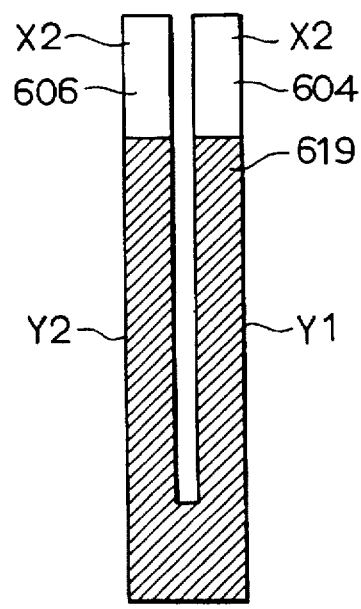
Figure 25:
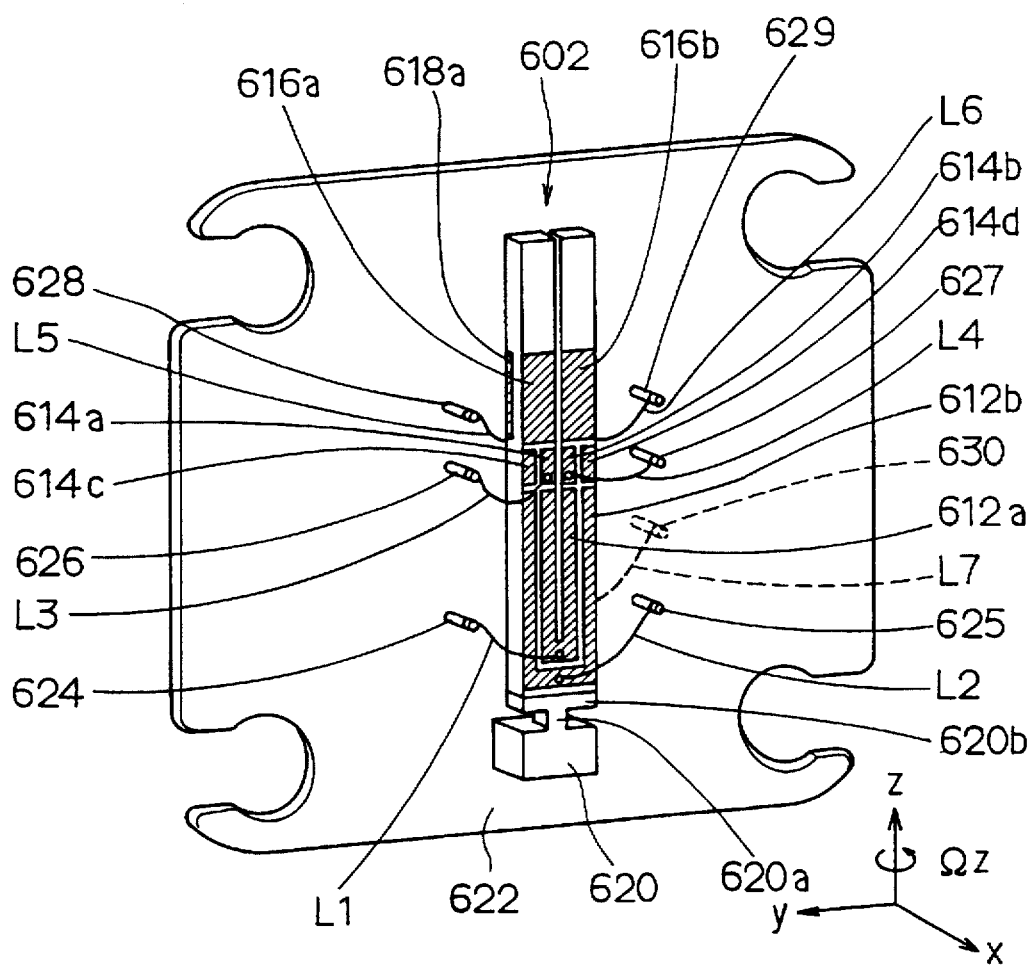
FIG. 25 is a perspective view illustrating the vibrator fixed to a substrate through the fixing member.

As shown in FIGS. 23A, 23B and 24A through 24E, vibrator 602 of the six embodiment is formed almost the same as vibrator 404 of the fourth embodiment. The only difference between them is that, in the sixth embodiment, common electrode 619 extends to a part of base face 602a of vibrator 602 as shown in FIG. 23B, and vibrator 602 is fixed in parallel to base 622 (See FIG. 25) through fixing member 620. Base 622 has six terminals 624 through 629 which are connected with driving electrodes 612a and 612b, monitor electrodes 614a and 614b, and detecting electrodes 618a and 618b via wires L1 through L6.

To detect angular velocity, common electrode 619 attached on the X2 face of vibrator 602 should be held at a predetermined reference voltage level. For example, as shown with broken lines in FIG. 25, a terminal 630 for common electrode 619 can be provided on base 622. Terminal 630 is connected to common electrode 619 by a wire L7. After that, the predetermined reference voltage is applied to terminal 630.

However, since common electrode 619 is attached on the back of vibrator 602, the time that it takes to connect wire L7 to common electrodes 619 is a problem. Furthermore, when the number of the wires increase, the S/N ratio of the angular velocity sensor deteriorates as a result of unnecessary vibration of the wires. If fixing member 620 or base 622 is isolated electrically, it works as an antenna for external electromagnetic fields. Accordingly, the voltage level thereof becomes unstable, and that affects the detection signal of the angular velocity which is a minute signal and makes the S/N ratio of the sensor deteriorate further.

For these reasons, according to the sixth embodiment, common electrode 619 is formed so that common electrode 619 extends over a portion of base face 602a of vibrator 602, and extended electrode 619a is electrically connected to fixing member 620 and base 622.

As a result, if base 622 is connected to a grounding terminal held to the reference voltage in the detecting circuit, common electrode 619 can be held to the reference voltage and connecting the wire supplying the reference voltage to common electrode 619 is unnecessary. Accordingly, the number of wires connected to vibrator 602 can be reduced and it does not take as much time to connect the wires to vibrator 602. Further the angular velocity sensor reduces unnecessary vibrations of the wires and variations of the voltage level of fixing member 620 and base 622.

Adhesive can be used to join vibrator 602 and fixing member 620. It is preferable to use adhesive which has a small damping coefficient after hardening, for example, thermohardening epoxies.

Figure 26A:
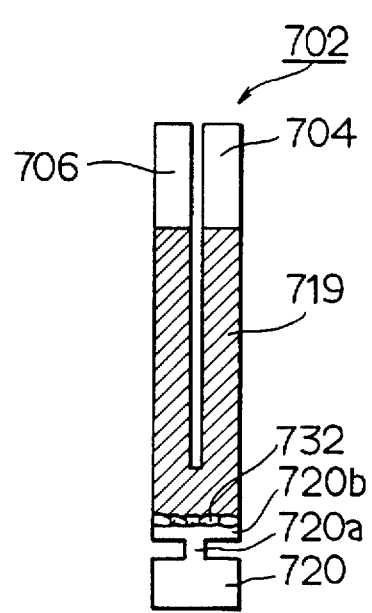
FIGS. 26A and 26B are schematic illustrations of a theory concerning conduction of electric current between a common electrode and fixing member.

In the sixth embodiment, common electrode 619 is conductive with fixing member 620 by extending common electrode 619 over at least a part of base face 602a. However, as an alternative shown in FIG. 26A, a conductive adhesive 732 can be used to join common electrode 719 and fixing member 720. Common electrode 719 is electrically connected to fixing member 720 by causing the conductive adhesive to push out toward common electrode 719 intentionally. This structure is even easier to manufacture than the sixth embodiment. In addition, after joining vibrator 702 and fixing member 720 with the adhesive, the conductive adhesive or conductive paste may be applied to common electrode 719 and fixing member 720. In this case, common electrode 719 is reliably electrically connected with fixing member 720.

Figure 26B:
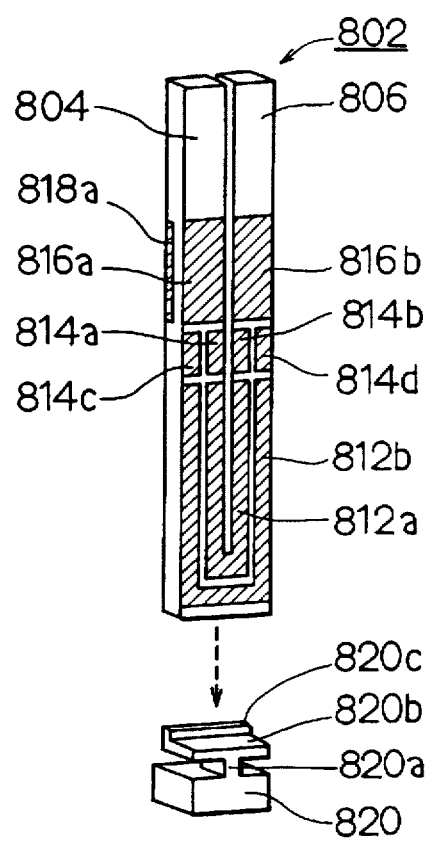

As a further alternative, as shown in FIG. 26B, a projecting portion 820c may be formed on an end of connecting portion 820b of fixing member 820 so that projecting portion 820c contacts common electrode 819 when joining vibrator 802 and fixing member 820. This projecting portion is made from the same material as fixing member 820. With this structure, common electrode 819 can be electrically connected with fixing member 820 through projecting member 820b. Further, because projecting portion 820b can contact a part of the side wall of vibrator 802, vibrator 802 can be fixed more securely.

If several of the methods described above for electrically connecting common electrode 819 with fixing member 820 are employed, the connection can be even more reliable.

The angular velocity sensor of the sixth embodiment is described as including vibrator 702 or 802 having the shape of a tuning fork. However, the methods of the sixth embodiment for electrically connecting the common electrode and the fixing member can be applied to an angular velocity sensor having a vibrator of any shape.

What is claimed is:

1. An angular velocity sensor comprising:
    a vibrator made from piezoelectric material and having a shape of a tuning fork, said turning fork being formed by a connecting portion and a pair of arms having first ends connected to said connecting portion;
    a pair of driving electrodes attached to said arms on a first nearly U-shaped side face of said vibrator for causing said vibrator to vibrate, said driving electrodes of said pair extending continuously from one of said arms to the other through said connecting portion and being parallel to each other;
    at least one detecting electrode attached on a lateral face of said vibrator which is at aright angle to said nearly U-shaped side faces and is on an outside face of said arms between said driving electrodes and second ends of said arms remote from said connecting portion, for generating a signal in accordance with vibrations of at least one of said arms in a direction perpendicular to a plane in which said arms lie;
    a common electrode attached to said arms on a second nearly U-shaped side face of said vibrator so that said driving electrodes and said common electrode sandwich said arms;
    a driving circuit for causing said vibrator to vibrate in a direction along said plane by applying alternating voltage signals having opposite phase to each other to said pair of driving electrodes, respectively; and
    a detection circuit means for detecting an angular velocity around a predetermined axis based on said signal generated by said detecting electrode.

2. An angular velocity sensor according to claim 1, wherein said detecting electrode is attached on a lateral face of said vibrator which is at a right angle to said nearly U-shaped side faces and is on an outside face of said arms.

3. An angular velocity sensor according to claim 2, further comprising:
    an operational amplifier for receiving an electric current signal detected by said detecting electrode and converting it into a voltage signal, said operational amplifier having a negative feedback loop including a resistance.

4. An angular velocity sensor according to claim 3, wherein said at least one detecting electrode includes a plurality of detecting electrodes and said detection circuit includes a differential amplifier which performs differential-amplification for detection signals from said detecting electrodes detected by converting electric current signals from said detecting electrodes into voltage signals.

5. An angular velocity sensor according to claim 2, further comprising:
    a monitor electrode provided on said first nearly U-shaped side face of said vibrator between said driving electrodes and said detecting electrode, for monitoring said vibrations of said arms, and for generating a monitor signal, said monitor signal being applied to said driving circuit for generating said alternating voltage signals.

6. An angular velocity sensor according to claim 5, further comprising:
    a first input circuit including an operational amplifier for converting electric current signal flowing from said detecting electrode into a first voltage signal.

7. An angular velocity sensor according to claim 5, further comprising:
    an input circuit including an operational amplifier for converting an electric current signal flowing from said monitor electrode into a voltage signal,
    wherein said driving circuits includes a self-excited oscillator for receiving said voltage signal, and for generating said alternating voltage signals to apply to said driving electrodes based on said voltage signal.

8. An angular velocity sensor according to claim 7, wherein said driving circuit includes filter circuit provided in a signal transmission line in which said alternating signals voltage is created from said voltage signal, for removing signal components other than frequency components which are necessary to cause said arms to vibrate.

9. An angular velocity sensor according to claim 6, further comprising:
    shielding member for shielding a signal transmission line from said detecting electrode to said first input circuit with a predetermined reference voltage level.

10. An angular velocity sensor according to claim 6, further comprising:
    shielding member for shielding a signal transmission line from said monitor electrode to said second input circuit with a predetermined reference voltage level.

11. An angular velocity sensor according to claim 5, wherein said driving electrodes, said monitor electrode and said detecting electrode are attached on said arms so that arrangements thereof on said arms are symmetrical to each other, and wires for connecting to said driving electrodes, said monitor electrode and said detecting electrode are symmetrical to each other.

12. An angular velocity sensor according to claim 5, wherein plural monitor electrodes are provided on said arms and at least one of said plural monitor electrodes is used to generate said monitor signal and a remainder of said plural monitor electrodes are held to a predetermined reference voltage level.

13. An angular velocity sensor according to claim 2, wherein gaps between adjacent electrodes on said arms are set to 0.1 mm or more.

14. An angular velocity sensor comprising:
    a vibrator made from piezoelectric material and having a shape of a tuning fork, said tuning fork being formed by a connecting portion and a pair of arms having first ends connected to said connecting portion;
    a pair of driving electrodes attached to said arms on a first nearly U-shaped side face of said vibrator for causing said vibrator to vibrate, said driving electrodes of said pair extending continuously from one of said arms to the other through said connecting portion and being parallel to each other;
    at least one detecting electrode attached on said first nearly U-shaped side face of said vibrator between said driving electrodes and second ends of said arms remote from said connecting portion for generating a signal in accordance with stress of at least one of said arms in an axial direction of said arms;
    a common electrode attached to said arms on a second nearly U-shaped side face of said vibrator so that said driving electrodes and said common electrode sandwich said arms;
    a driving circuit for causing said vibrator to vibrate in a direction along said plane by applying alternating voltage signals having opposite phase to each other to said pair of driving electrodes, respectively; and a detection circuit for detecting an angular velocity around a predetermined axis based on said signal generated by said detecting electrode.

15. An angular velocity sensor according to claim 14, further comprising:

an operational amplifier for receiving an electric current signal detected by said detecting electrode and converting it into a voltage signal, said operational amplifier having a negative feedback loop including a resistance.

16. An angular velocity sensor according to claim 14, further comprising:

a monitor electrode provided on said first nearly U-shaped side face of said vibrator between said driving electrodes and said detecting electrode, for monitoring said vibrations of said arms, and for generating a monitor signal, said monitor signal being applied to said driving circuit for generating said alternating voltage signals.

17. An angular velocity sensor according to claim 14, wherein gaps between adjacent electrodes on said arms are set to 0.1 mm or more.

18. An angular velocity sensor according to claim 1, wherein said at least one detecting electrode includes a plurality of detecting electrodes disposed on said arms, said detecting electrodes being disposed at positions closer to said second ends of said arms than said driving electrodes.

19. An angular velocity sensor according to claim 18, further comprising:

a plurality of operational amplifiers, one for receiving an electric current signal detected by each of said detecting electrodes, respectively, and converting each electric current signal into a voltage signal, each said operational amplifier having a negative feedback loop including a resistance.

20. An angular velocity sensor according to claim 18, further comprising:

a monitor electrode provided on said first nearly U-shaped side face of said vibrator between said driving electrodes and said detecting electrodes, for monitoring said vibrations of said arms, and for generating a monitor signal, said monitor signal being applied to said driving circuit for generating said alternating voltage signals.

21. An angular velocity sensor according to claim 18, wherein gaps between adjacent electrodes on said arms are set to 0.1 mm or more.

22. An angular velocity sensor according to claim 1, further comprising:

a fixing member for fixing said vibrator to an object in which an angular velocity is to be detected, said fixing member being located between said connecting portion of said vibrator and said object.

23. An angular velocity sensor according to claim 22, wherein said fixing member includes a thin portion formed narrower than a width of said connecting portion of said vibrator.

24. An angular velocity sensor according to claim 23, wherein said thin portion is formed symmetrical in regard to a center of vibration of said vibrator.

25. An angular velocity sensor according to claim 23, wherein a contacting face of said fixing member is formed having a same shape as a base face of said vibrator.

26. An angular velocity sensor according to claim 25, wherein said vibrator and said fixing member are formed so that an equation described below is satisfied:

$$Ea \times a = Eb \times b$$

wherein "Ea" is Young's modulus of said vibrator, "a" is a thickness of said connecting portion, "Eb" is Young's modulus of said fixing member, and "b" is a length from said contacting face to said thin portion of said fixing member.

27. An angular velocity sensor according to claim 25, wherein said vibrator and said fixing member are formed so that an equation described below is satisfied:

$$\{b/(a+b)\} \times Eb/Ea \leq 1.2$$

wherein "Ea" is Young's modulus of said vibrator, "a" is a thickness of said connecting portion, "Eb" is Young's modulus of said fixing member, and "b" is a length from said contacting face to said thin portion of said fixing member.

28. An angular velocity sensor according to claim 25, further comprising:

an adhesive layer, having a thickness of 20 μm or less, provided between said contacting face of said fixing member and said base face of said vibrator.

29. An angular velocity sensor according to claim 22, wherein said fixing member is formed by a conductive metal, and is connected to said common electrode to be held to a predetermined reference voltage level.

30. An angular velocity sensor according to claim 29, wherein said common electrode extends over a portion of a base face of said vibrator to secure a contact with said fixing member.

31. An angular velocity sensor according to claim 29, further comprising:

a conductive projecting portion formed in a vicinity of a contacting face of said fixing member to said vibrator, said conductive projecting portion being in electrical contact with said common electrode.

32. An angular velocity sensor according to claim 29, wherein said vibrator and said fixing member are joined by a conductive adhesive, and said conductive adhesive is pushed out to contact said common electrode.

33. An angular velocity sensor according to claim 1, wherein said piezoelectric material is PZT.

34. An angular velocity sensor according to claim 14, wherein said piezoelectric material is PZT.

35. An angular velocity sensor according to claim 6, further comprising:

a second input circuit including an operational amplifier for converting an electric current signal flowing from said monitor electrode into a second voltage signal, wherein said detection circuit includes a synchronous demodulation circuit for receiving said first voltage signal and said second voltage signal, and for synchronously demodulating said first voltage signal using said second voltage signal as a reference signal.

36. An angular velocity sensor according to claim 22, wherein said arms and said connecting portion of said vibrator have an approximately constant width.

* * * * *